(12) United States Patent
Coultas et al.

(10) Patent No.: US 11,846,218 B2
(45) Date of Patent: Dec. 19, 2023

(54) PROCESS FOR COMMISSIONING AN EXHAUST PARTICULATE FILTER

(71) Applicant: Infineum International Limited, Abingdon (GB)

(72) Inventors: David R. Coultas, Oxford (GB); Amy J. Challinor, Reading (GB); David Jilbert, Swindon (GB)

(73) Assignee: Intineum International Ltd., Abington (GB)

( * ) Notice: Subject to any disclaimer, the term of this patent is extended or adjusted under 35 U.S.C. 154(b) by 0 days.

(21) Appl. No.: 17/126,637

(22) Filed: Dec. 18, 2020

(65) Prior Publication Data
US 2021/0189928 A1 Jun. 24, 2021

(30) Foreign Application Priority Data

Dec. 20, 2019 (EP) .................................. 19218687
Dec. 11, 2020 (EP) .................................. 20213319

(51) Int. Cl.
| F01N 3/023 | (2006.01) |
| B60K 6/24 | (2007.10) |
| B60K 6/26 | (2007.10) |
| C10L 1/12 | (2006.01) |
| C10L 1/30 | (2006.01) |
| C10L 10/02 | (2006.01) |
| F01N 3/022 | (2006.01) |

(Continued)

(52) U.S. Cl.
CPC ................ F01N 3/023 (2013.01); B60K 6/24 (2013.01); B60K 6/26 (2013.01); C10L 1/1233 (2013.01); C10L 1/305 (2013.01); C10L 10/02 (2013.01); F01N 3/022 (2013.01); F02M 21/0209 (2013.01); F02M 21/08 (2013.01); F02M 25/00 (2013.01); C10L 2200/0423 (2013.01); C10L 2200/0446 (2013.01); C10L 2200/0469 (2013.01); F01N 2330/06 (2013.01)

(58) Field of Classification Search
CPC ...... F01N 3/023; F01N 3/022; F01N 2330/06; B60K 6/24; B60K 6/26; C10L 1/1233; C10L 1/305; C10L 10/02; C10L 2200/0423; C10L 2200/0446; C10L 2200/0469; F02M 21/0209; F02M 21/08; F02M 25/00

See application file for complete search history.

(56) References Cited

U.S. PATENT DOCUMENTS 3,960,528 A * 6/1976 Jacobs ..................... F01N 3/037
55/424
9,599,051 B2 * 3/2017 Lundstedt ............. F02D 41/027
(Continued)

FOREIGN PATENT DOCUMENTS

| DE | 102016103735 A1 | 9/2017 |
| DE | 102017219937 A1 | 5/2019 |

(Continued)

OTHER PUBLICATIONS

European Search Report Application No. 20213319.5.

Primary Examiner — Cephia D Toomer

(57) ABSTRACT

A process is provided for commissioning a particulate filter for the exhaust system of a device powered in whole or in part by an internal combustion engine. The process improves the filtration efficiency of an uncarbonized or decarbonized particulate filter through a single deposition of metal oxide particles via a gas stream.

11 Claims, 6 Drawing Sheets

(51) Int. Cl.
    *F02M 21/02*     (2006.01)
    *F02M 21/08*     (2006.01)
    *F02M 25/00*     (2006.01)

(56) References Cited

U.S. PATENT DOCUMENTS

| | | | | |
|---|---|---|---|---|
| 2004/0176246 | A1* | 9/2004 | Shirk | F01N 3/0226 |
| | | | | 502/439 |
| 2010/0101211 | A1* | 4/2010 | Thompson | C10L 10/06 |
| | | | | 60/274 |
| 2016/0363019 | A1 | 12/2016 | Warner et al. | |

FOREIGN PATENT DOCUMENTS

| | | |
|---|---|---|
| DE | 102017219938 A1 | 5/2019 |
| DE | 102018128416 A1 | 8/2019 |
| EP | 1512736 A1 | 9/2005 |
| WO | 2017201171 A1 | 11/2017 |
| WO | 2018046383 A1 | 3/2018 |
| WO | 2018115900 A1 | 6/2018 |

\* cited by examiner

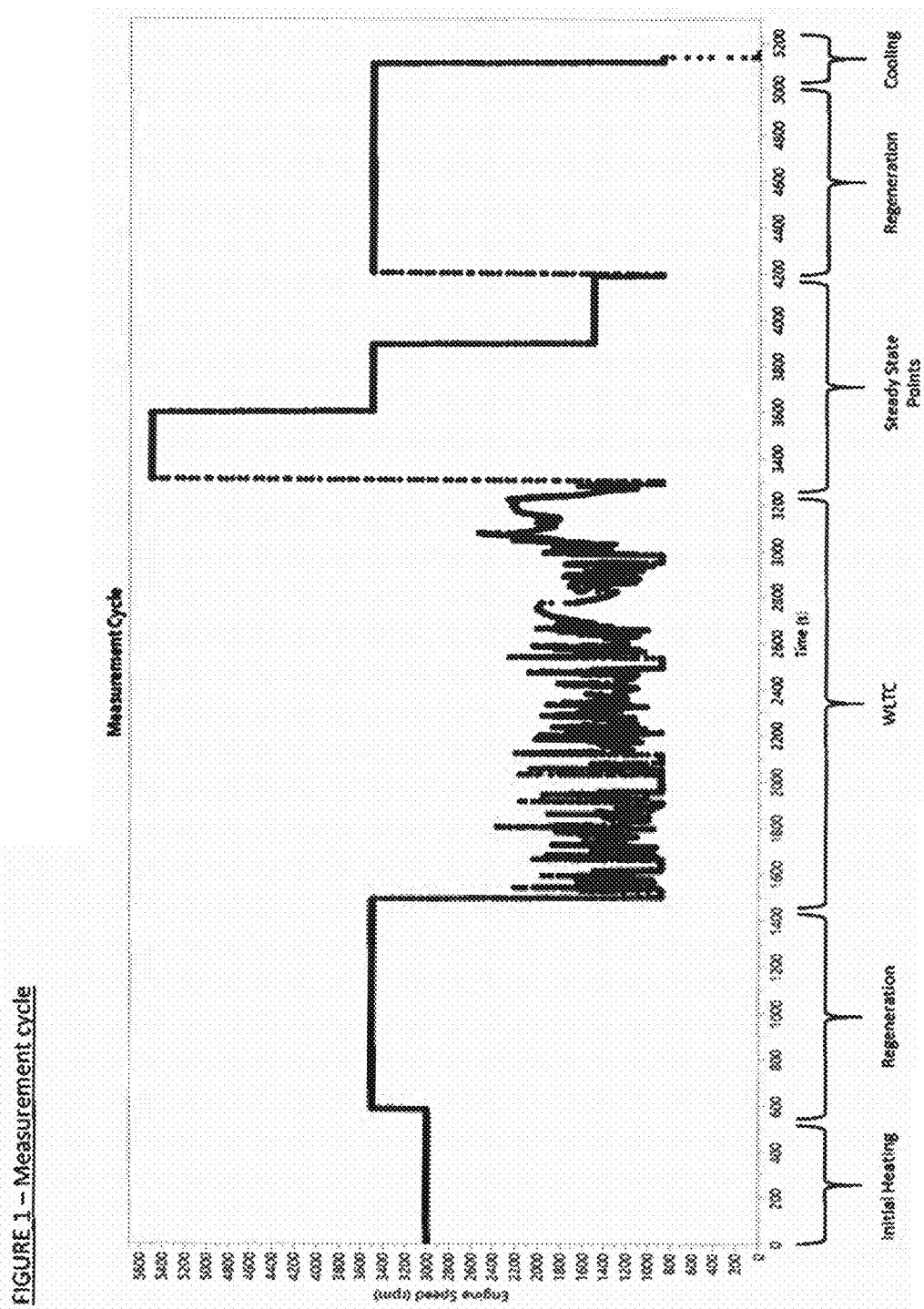

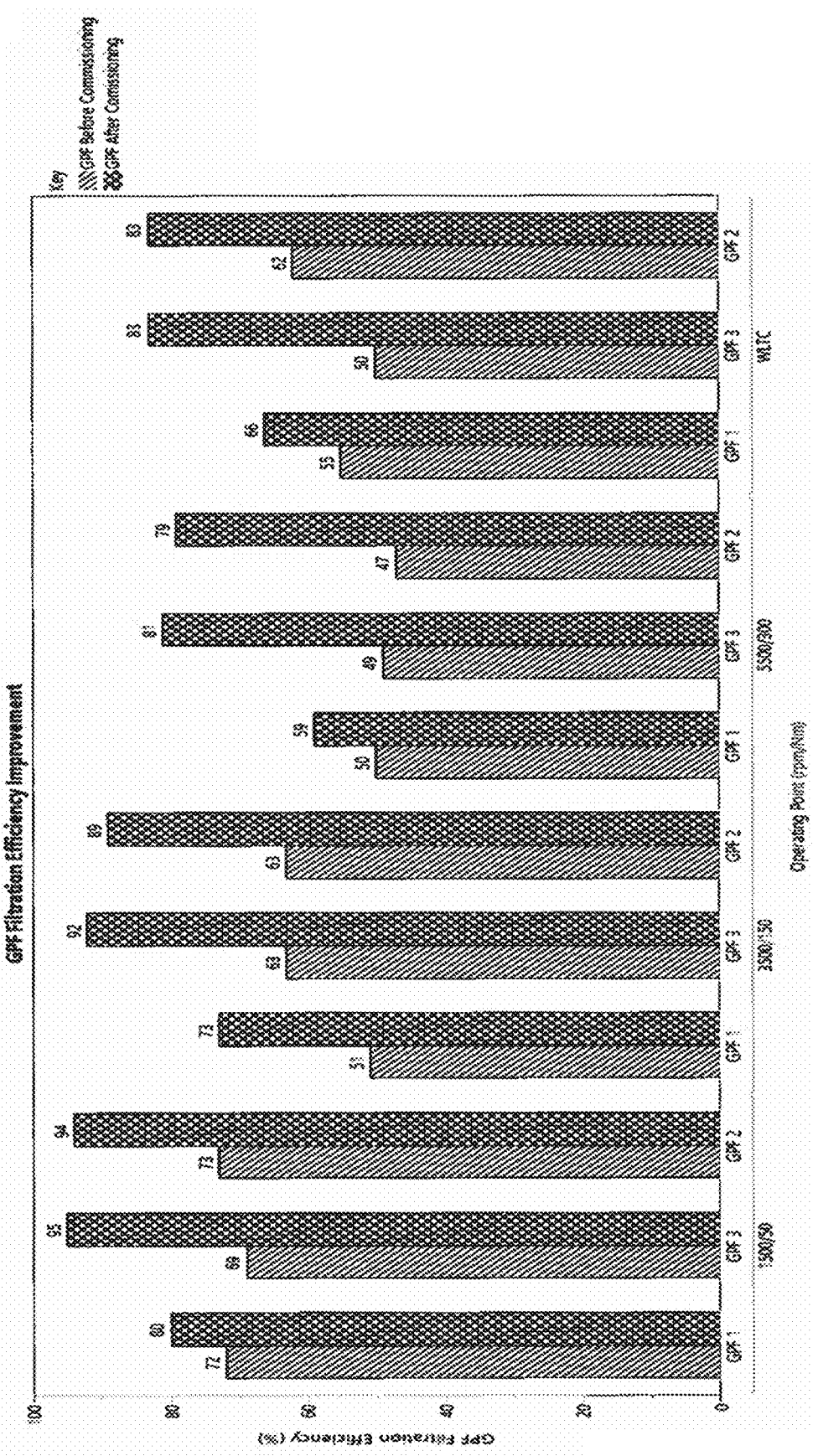

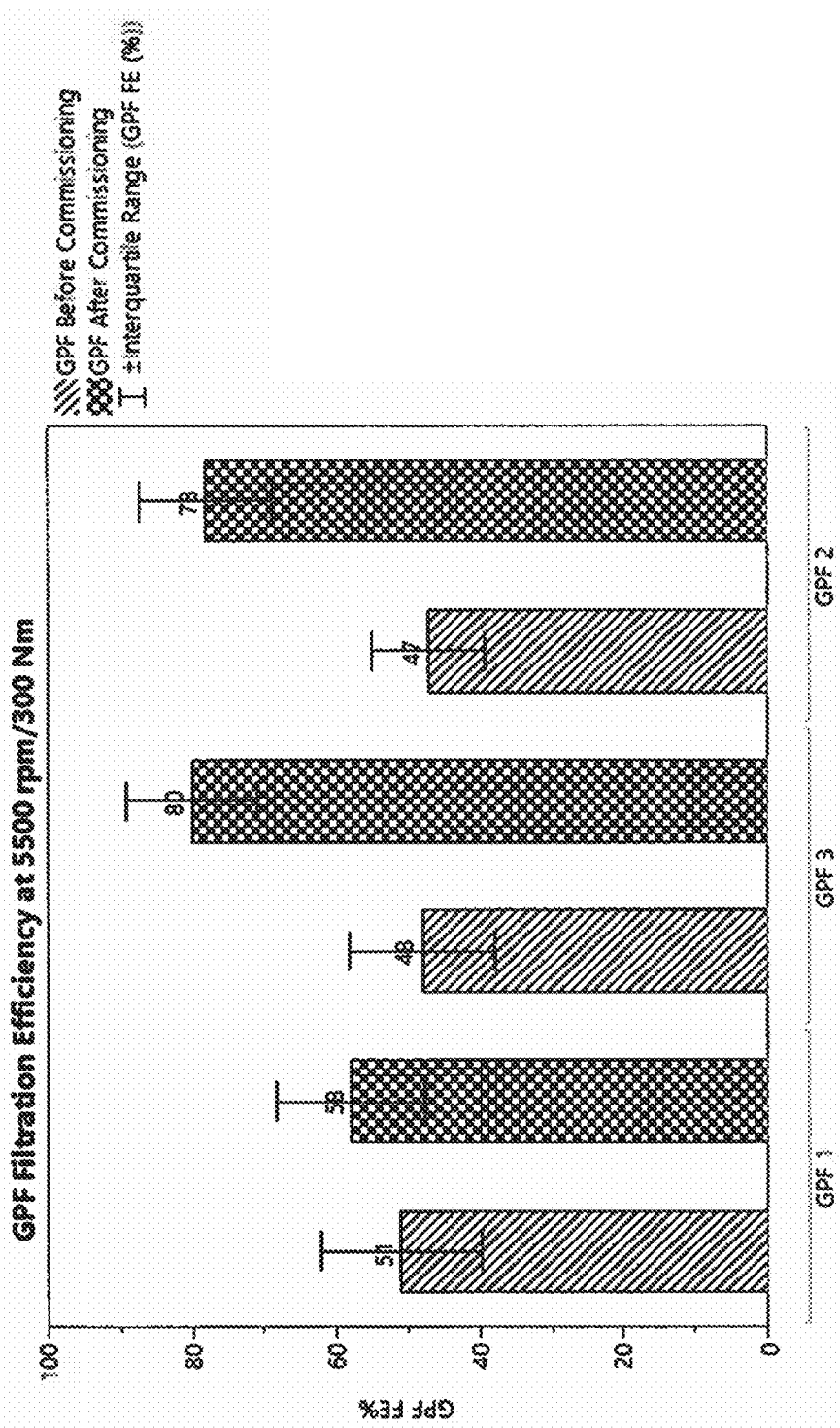

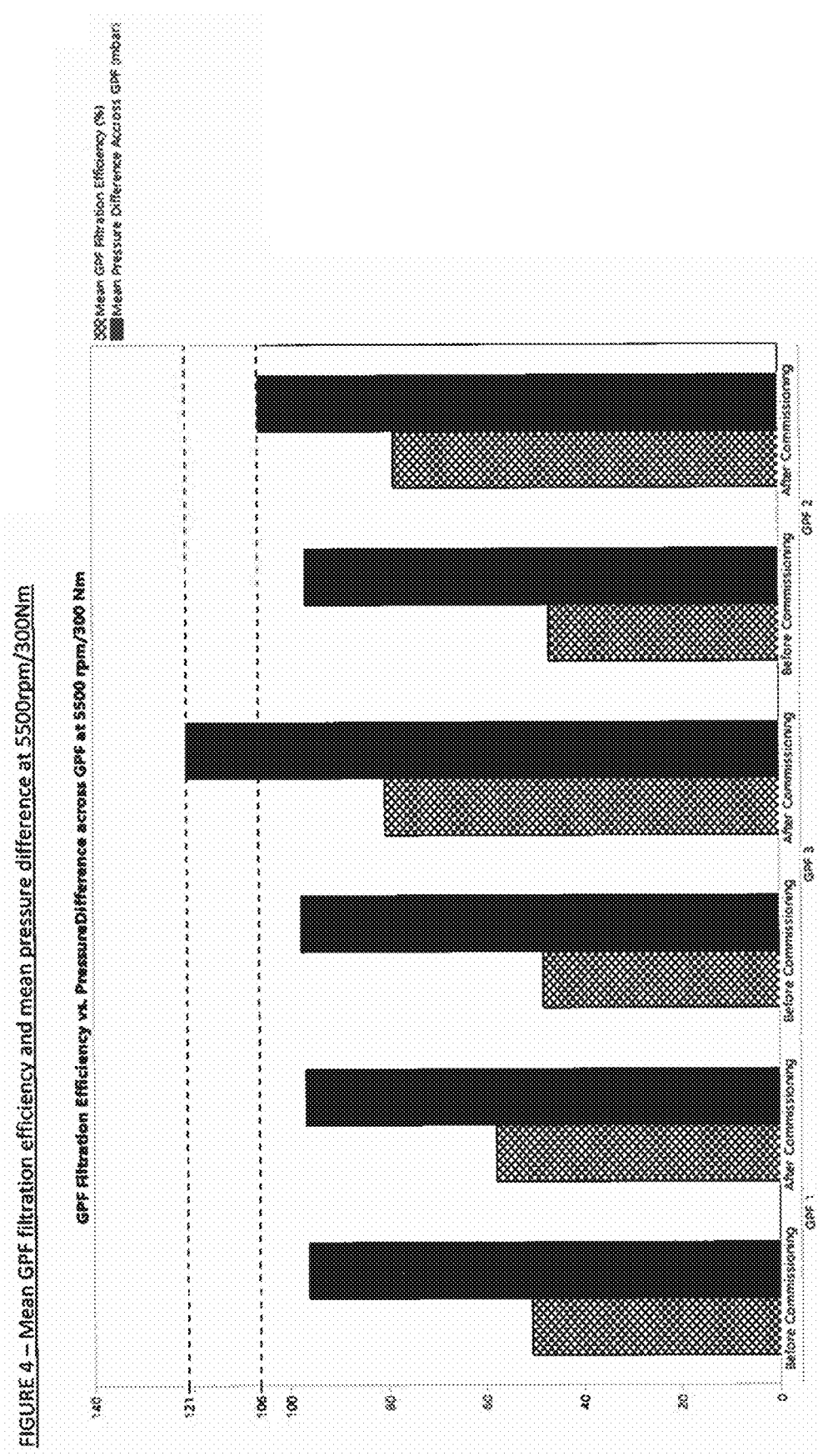

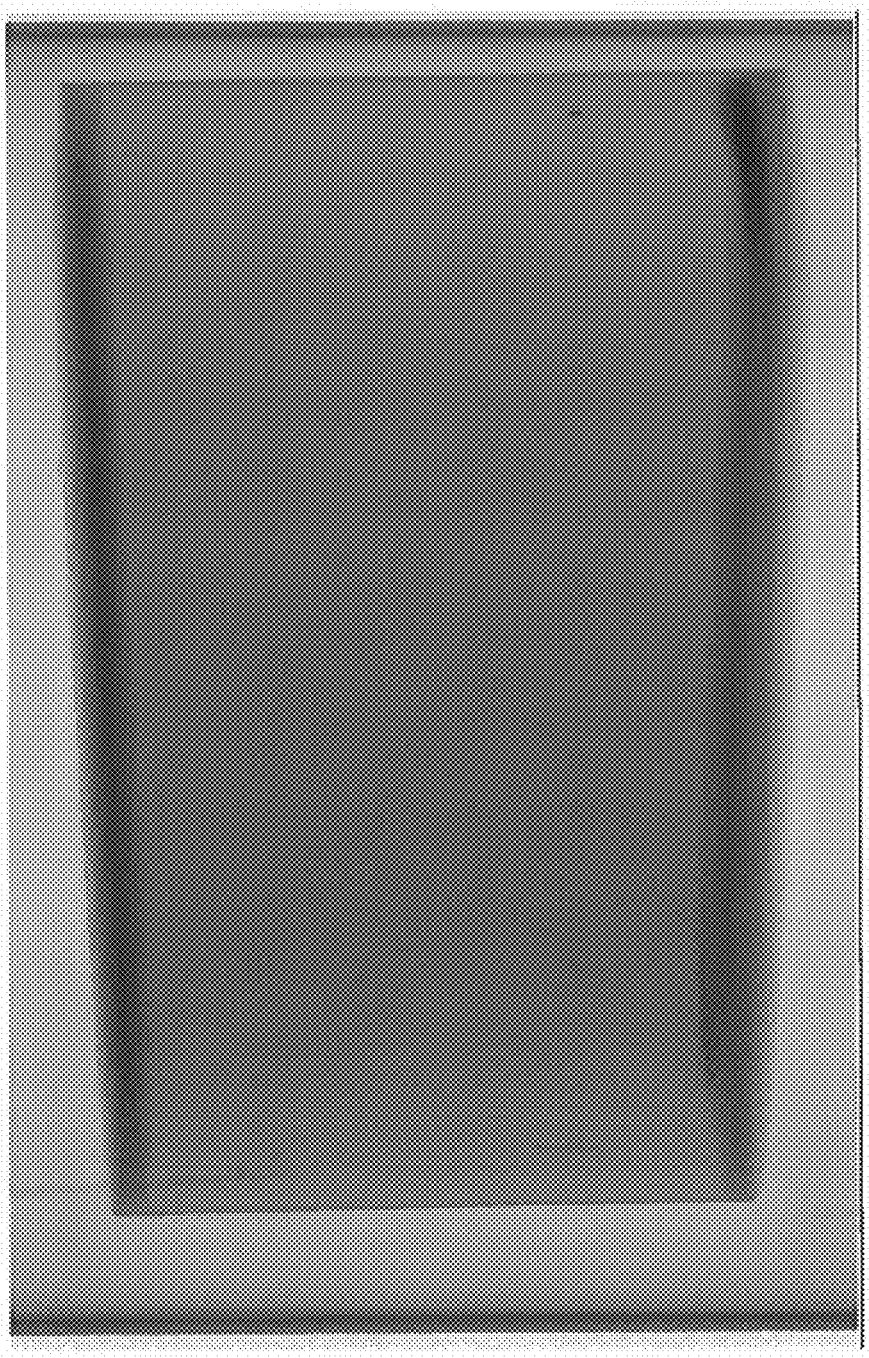
Figure 5 – Radiograph of GPF2 after commissioning

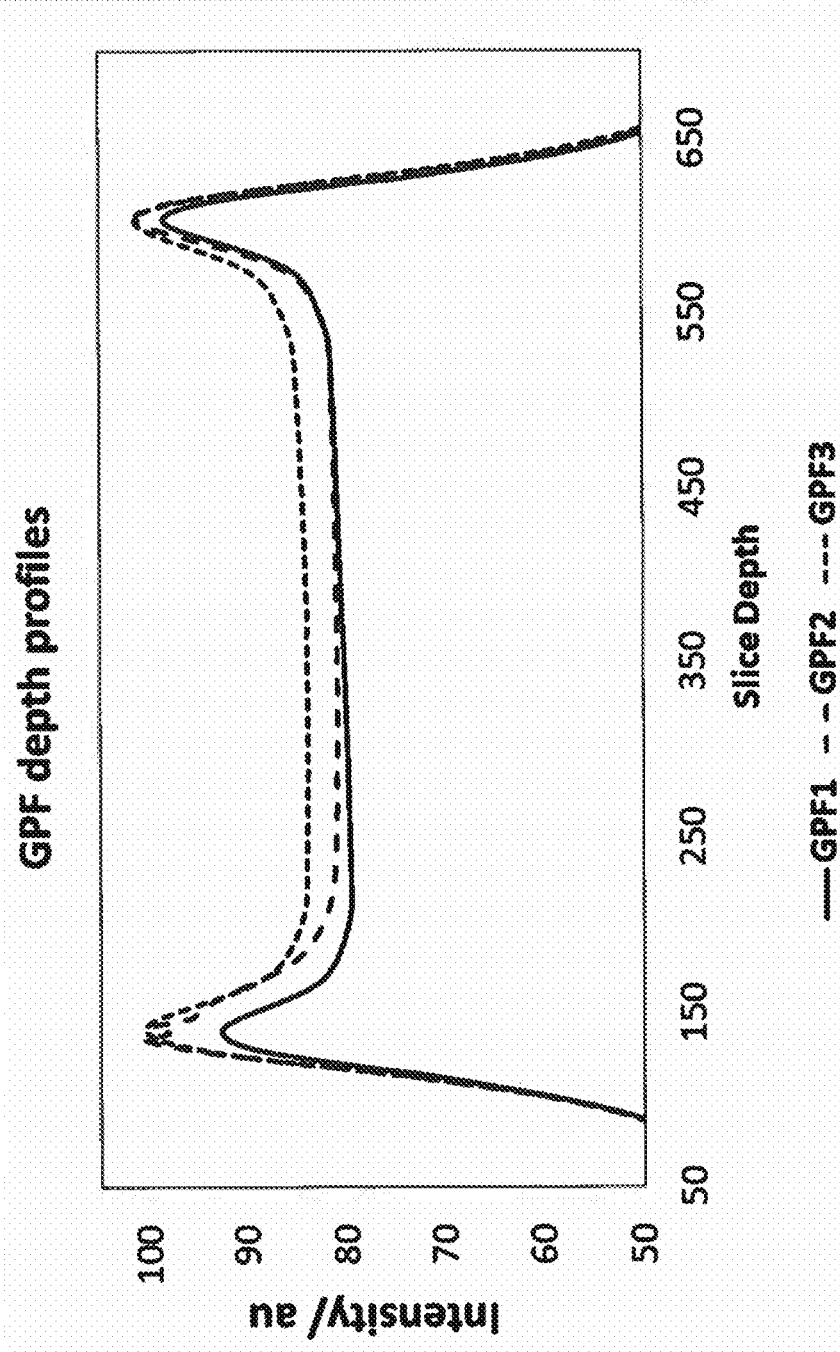
Figure 6 – GPF depth profiles after commissioning

PROCESS FOR COMMISSIONING AN EXHAUST PARTICULATE FILTER

The present invention concerns improvements in hydrocarbonaceous particulate emission control from devices powered in whole or in part by internal combustion engines running on gaseous or, preferably, liquid hydrocarbonaceous fuels, and especially by spark-ignition internal combustion engines running on gasoline fuel. In particular, it provides improvements in the operational efficiency of particulate filters fitted in the exhaust systems of such devices, through a commissioning process for such filters which leads to a measurable increase in filtration efficiency towards hydrocarbonaceous particulate emissions. This commissioning process allows such filters to reach higher filtration efficiency sooner after installation with less concomitant build-up of exhaust back-pressure which can otherwise adversely affect engine operation in service.

The use of particulate filters in the exhaust system of diesel engines is a well-known hardware strategy to control tailpipe hydrocarbonaceous particulate emissions. Over the years, the diesel engine has become renowned as a producer of hydrocarbonaceous particulates, partly due to the inherent characteristics of compression-ignited combustion, and partly in view of engine design strategies which have favoured lower peak combustion temperatures to reduce noxious nitrogen-oxides in exhaust gas emissions. This emissions balancing act has meant the production of increased levels of engine-out particulates by virtue of the NOx-particulate trade-off, and brought about the need for exhaust after-treatment to thereafter reduce tailpipe particulate emissions to acceptable levels. Increasingly stringent legislated emissions limits on hydrocarbonaceous particulate emissions have also driven the adoption of diesel particulate filters.

The diesel particulate filter is essentially a fine sieve for the hydrocarbonaceous particulate matter that is entrained in the exhaust gas mixture released from the engine. Commercial filters are typically ceramic monoliths or metallic wire structures that provide a series of fine channels through which the exhaust gas mixture passes. Hydrocarbonaceous particulate matter supplied in the flowing gas stream is restrained on the surfaces of the filter channels. Over time, this build-up of hydrocarbonaceous particulate matter on the filter must be cleaned away to maintain effective filter operation, and this is typically done by a secondary combustion process in the filter called regeneration. In regeneration, the collected particulate which is hydrocarbonaceous (sometimes called carbonized deposit, or 'soot') is combusted with oxygen within the flowing exhaust gas stream. Conditions favourable to this combustion are created by post-injection of fuel into the exhaust gas flow, or by the use of heaters around the particulate filter, to raise exhaust gas temperature to spontaneous combustions levels for the collected hydrocarbonaceous matter (about 600° C. or higher); or by the use of catalytic materials either incorporated into the filter or supplied via the fuel or into the exhaust gas flow. This cyclic process of carbonisation (through particulate build-up) and regeneration is a long-term characteristic of particulate filter use, and a variety of hardware and engine systems have been developed to manage it effectively. Typically, however, regeneration in situ in the vehicle does not completely decarbonize the filter, and some residual carbonisation remains. Filters may periodically be removed from the vehicle and reconditioned back to their decarbonized state. Reconditioned filters are also available as spare parts in view of the considerable cost of new filters.

The diesel engine has typically been the focus of particulate emission controls, but more recently the use of direct-injection gasoline engines and ever more stringent focus on emissions legislation have brought into question the level of hydrocarbonaceous particulate emissions from gasoline and other clean-fuel engines such as gas engines. Particulate filters are now also being designed for use with these engines, and the adaptable nature of exhaust after-treatment is making particulate filters of interest as a general emissions-control strategy across the range of internal combustion engine types.

In addition to carbonisation in use, particulate filters are also susceptible to gradual build-up of "ash" deposits. These deposits take the form of metallic oxides and other salts arising from the steady combustion of small amounts of the metallic-based lubricant additives such as detergents. These metallic-based additives are typically salts of alkali metals or alkaline earth metals, and are found in the lubricating oil which lines the combustion chamber surfaces such as the cylinder walls and is gradually consumed in small amounts during engine operation. In addition, metal residues from engine wear contribute to ash deposits. This long-term build-up of ash has the effect of occluding particulate filter channels, reducing effective filter volume and also affecting gas-flow through the particulate filter and engine operation due to the consequent build-up of higher exhaust back-pressures.

A fundamental design consequence of the long-term residual carbonisation and ash build-up in particulate filters is the need to build in tolerance in newly-manufactured filter channel dimensions to allow for this deposit build-up over time in service. Here the manufacturer faces another trade-off in operational design. A filter made with finer channel dimensions will have a higher filtration efficiency when new, and allow the vehicle manufacturer to meet lower tailpipe particulate emissions fresh from the factory gate. However, filter blockage will also occur more readily, and the long-term build-up of residual carbon deposits and ash can narrow the channels to such an extent that exhaust gas flow through the filter becomes seriously inhibited, thereby adversely affecting the operation of the engine over time through an unacceptable increase in exhaust back-pressure. Long-term unscheduled maintenance and customer dissatisfaction can result. Consequently, manufacturers commonly allow for the effects of long-term residual deposition by producing filters with newly-manufactured channel dimensions that are designed to accommodate a degree of ash accumulation over long-term operation. This reduces the risk of long-term problems developing, but consequently the factory-fresh filters will have lower filtration efficiency and offer a less meaningful initial contribution to tailpipe emissions control, or potentially even fail the necessary emissions certification.

There thus exists in the art a need for strategies which enable the use of particulate filters designed with tolerance in channel dimensions to accommodate long-term residual deposition, whilst having improved filtration efficiency when newly-fitted for greater hydrocarbonaceous particulate emission control, especially without the generation of increased initial back pressure which can adversely affect exhaust gas flow and engine operation, especially at higher speeds and loads which generate higher levels of hydrocarbonaceous particulates.

A paper published on 17th October, 2016 by the Society of automotive Engineers (cited as: Shae, H., Lam, W., Remias, J. et al. "Effect of Lubricant Oil Properties on the Performance of Gasoline Particulate Filter (GPF)," *SAE Int. J.*

*Fuels Lubr.* 9(3):650-658, 2016, https://doi.org/10.4271/2016-01-2287) proposes the introduction into engine fuel of a high proportion (the order of 2% by mass) of lubricating oil treated with metal-containing lubricant additives, in an attempt to accelerate the natural deposition of lubricant-derived ash deposits and thereby increase filter efficiency. However, such an approach carries a number of disadvantages.

Firstly, the introduction of lubricating oil introduces to the fuel a significant amount of a base hydrocarbonaceous oil of lubricating viscosity. This is a heavier organic fraction that is less volatile and combustible than base hydrocarbonaceous fuel, and therefore cannot practically be supplied to the engine in gaseous fuel, and burns less cleanly than liquid fuel, contrary to the general aim of reducing particulate and other emissions. The lower volatility and different chemical composition of base lubricating oil is also more susceptible to the formation of gummy and carbonaceous deposits on critical surfaces of the fuel system that are themselves made to fine operational tolerances, such as fuel injector nozzles. Build-ups of deposits in this area disrupt fuel flow and combustion efficiency. Heavier components in the lubricating oil are also more likely to separate out from the fuel and lead to filterability problems within the fuel system. Thus, introducing lubricating oil into the fuel, especially in the suggested quantities, brings a number of associated operational concerns.

Secondly, the typical additives used in lubricating oil include metallic detergents and other ash-forming additives, also containing elements such as sulfur and phosphorus. The consequential oxidation products of sulfur and phosphorus formed in the combustion chamber are themselves harmful to emissions controls, since they are acidic and poisonous to catalysts based on platinum or other precious metals positioned elsewhere in the exhaust system for controlling gaseous emissions. The net increase in these elements passing into the combustion chamber by virtue of their addition to the fuel, in addition to small amounts entrained in consumed oil, results in increased potential for acidity and catalyst poisoning. The typical lubricant metal content eventually depositing as ash in the particulate filter also leads to an increase over time in back-pressure in the exhaust system.

Thirdly, the use of lubricating oil at 2% mass in the fuel increases fuel costs.

Lastly, the use of additives originating from lubricating oil in this way serves merely as an attempt to 'mirror' the natural build-up of lubricant ash, and in effect seeks to accelerate the known, long-term deposition problem in particulate filters for short-term benefit. It does not attempt to improve the nature of ash deposition, and does not offer an independent solution to the need for improved hydrocarbonaceous particulate filtration efficiency when newly-manufactured or fitted.

There remains a need in the art for an independent solution to improving the filtration efficiency of newly-manufactured or fitted hydrocarbonaceous particulate filters designed for long-term operation, especially without the generation of increased initial back pressure which can adversely affect exhaust gas flow and engine operation, especially at higher speeds and loads.

The present invention firstly provides a process for commissioning a new or newly-reconditioned particulate filter which improves its initial filtration efficiency whilst generating less back-pressure increase than the prior art use of lubricating oil in the fuel, particularly at higher speed and load engine conditions. The process of the invention has the further advantage that it can be performed on the filter in advance of its installation on the vehicle, and is thus not dependent upon engine operation; or, when performed with the filter in situ in the vehicle, does not consume expensive lubricating oil and avoids the other disadvantages of adding lubricating oil into the fuel. The process of the present invention provides a solution that can be deployed equally on uncarbonized new, and decarbonized reconditioned particulate filters, and is adaptable for use with both gaseous- and liquid-fuelled engines.

In a first aspect, the present invention accordingly provides a process for commissioning a particulate filter for the exhaust system of a device, the device being powered in whole or in part by an internal combustion engine fuelled either by a liquid hydrocarbonaceous fuel untreated with lubricating oil or by a gaseous hydrocarbonaceous fuel, the process comprising:

(i) passing a gas stream through an uncarbonized new, or decarbonized reconditioned, particulate filter;

(ii) releasing into the gas stream upstream of the particulate filter a flow of metal oxide particles in a single period of release sufficient to deposit metal oxide particles onto the uncarbonized or decarbonized surfaces of the channels of the filter exposed to the gas stream, and thereby obtain a measurable increase in filtration efficiency towards hydrocarbonaceous particulate emissions; and (iii) consigning the particulate filter to operate on the exhaust gas emitted from the internal combustion engine of the device in service.

In a second aspect of the invention, the present invention provides the commissioned particulate filter obtainable by, and preferably obtained by, the process of the first aspect of the invention.

Other aspects and advantages of the invention are hereinafter described in more detail.

The invention is further illustrated in the following Figures in which:

FIG. 1 shows the vehicle measurement cycle used in the examples to measure the filtration efficiency of a fitted particulate filter towards hydrocarbonaceous particles;

FIG. 2 compares the filtration efficiency results of gasoline particulate filters ("GPFs") commissioned according to the invention and the prior art;

FIG. 3 expands on the results in FIG. 2 regarding the engine operating point of 5500 rpm and 300 Nm torque;

FIG. 4 shows the mean filtration efficiency and mean pressure difference across the GPFs compared in FIG. 3;

FIG. 5 is a radiograph of a gasoline particulate filter (GPF) after commissioning according to the process of the present invention; and FIG. 6 shows X-ray depth profiles along the lengths of the filter channels in the filter commissioned according to the invention in FIG. 5.

The process of the first aspect of the invention is directed to commissioning a particulate filter. This commissioning is carried out on a new, uncarbonized particulate filter or on a decarbonized, reconditioned particulate filter, i.e. a particulate filter that carries insubstantial, and preferably no, carbonized deposit within it. This lack of carbonized deposit allows the metal oxide particles direct access to the surfaces of the channels of the filter exposed to the gas stream passing through it, whereupon the resulting deposition of said metal oxide is associated with an advantageous increase in filtration efficiency. The concept of commissioning is well known to the practising engineer, but can be understood in this context as the steps by which the relevant equipment is made ready for service, i.e. made ready for long-term regular use at which point it may be consigned for long-term regular use. The first aspect of the invention provides an improved process for commissioning a new or reconditioned particulate filter which permits the filter to begin operation in service at higher filtration efficiency, and provides the other advantages described above for the invention.

Whilst not wishing to be bound by theory, but drawing on the experiments presented herein, the commissioning process of the present invention is believed to result in a deposition of metal oxide particles within the particulate filter that, in its nature and/or distribution, is surprisingly more favourable to increasing initial filtration efficiency without attendant increase in exhaust back-pressure than the lubricating oil treatment of fuel proposed in the prior art. This advantageous effect is achieved before the filter becomes significantly carbonized, and is thus not related to a known catalytic action of the metal oxide on hydrocarbonaceous deposits within a carbonized filter.

Filtration efficiency may be determined using particle counters deployed to record particle number before and after a gasoline particulate filter (two separate measurements, both in 1/s) to allow the calculation of efficiency of the GPF towards particle filtration; where GPF Filtration Efficiency=(Particulate number before GPF−Particulate number after GPF)×100%

(%, calculated) Particulate number before GPF

By way of nonlimiting examples, a measurable increase in filtration efficiency, such as towards hydrocarbonaceous particles may thus be an increase of at least 0.01%, at least 0.1%, at least 0.5%, at least 1%, at least 2%, at least 3%, at least 5%, at least 10%, at least 15%, at least 20%, at least 25% or at least 30% as determined by the method above. Although not approaching the limit of measurability, selected upper limits to the increase in filtration efficiency (each of which may be independently combined with each of the lower limits above) may be no more than 1000%, no more than 500%, no more than 200%, no more than 100%, no more than 80%, no more than 75%, no more than 60%, no more than 50% and no more than 40% as determined by the method above.

In one embodiment of the process of the first aspect of the invention, commissioning steps (i) and (ii) may be conducted with the particulate filter installed in its operating position in the exhaust system of the device of step (iii).

In this embodiment of the invention, it is preferred that the gas stream of commissioning step (i) is the exhaust gas stream emitted from the internal combustion engine of the device when first operated after installation of the particulate filter, and wherein the metal oxide particles used in commissioning step (ii) are released into this exhaust gas stream upstream of the particulate filter either:
 (a) by addition of the metal oxide or a precursor thereof to the engine fuel in a form which, upon combustion of the fuel, releases metal oxide particles into the exhaust gas stream emitted from the combustion chamber; or
 (b) by direct release of the metal oxide particles into the exhaust gas stream.

In an alternative embodiment of the first aspect, commissioning steps (i) and (ii) are conducted on the particulate filter before it is installed in its operating position in the exhaust system of the device used in step (iii). In this embodiment, it is preferred that the particulate filter is firstly attached to a gas line downstream of a gas stream source remote from the device, step (i) thereafter being conducted with a gas stream other than engine exhaust gas from the device; wherein the metal oxide particles used in step (ii) are released directly into this gas stream, upstream of the particulate filter and wherein, in step (iii), the particulate filter is detached from the remote gas line and positioned operationally in the exhaust system of the device.

The process of the first aspect is preferably directed to commissioning a particulate filter for a device which is a vehicle or marine vessel, or a stationary generator or plant. Preferably, this process is directed to commissioning a particulate filter for a vehicle, more preferably a road vehicle, and even more preferably a passenger car road vehicle, in particular a passenger car road vehicle powered in whole or in part by a spark-ignition internal combustion engine.

The process of the first aspect is also preferably directed to commissioning a particulate filter for a device powered by an internal combustion engine fuelled by a liquid hydrocarbonaceous fuel untreated with lubricating oil. The absence of any lubricating oil treatment ensures that addition to the liquid fuel of heavier hydrocarbon species from the lubricating base oil, and of additives deployed in lubricating oils, are both avoided. It is an essential feature of the invention that, before being supplied to the engine, the liquid fuel is not treated by the prior art addition thereto of lubricating oil and/or the lubricating oil additives originating therefrom (which lead to the disadvantages of the prior art which employs the conscious addition of lubricating oil to the fuel prior to its supply to the engine). References to the "liquid hydrocarbonaceous fuel being untreated with lubricating oil" should be understood to expressly exclude the treatment of the fuel by the addition thereto, prior to it reaching the engine, of lubricating oil containing lubricating oil basestock and/or the additives originating therefrom which improve oil properties or performance.

Preferably, the internal combustion engine is fuelled by liquid hydrocarbonaceous fuel which is diesel or gasoline petroleum fuel, or biofuel, or mixtures thereof. More preferably, the internal combustion engine is fuelled by gasoline fuel or biofuel, or mixtures thereof; and most preferably the internal combustion engine is fuelled by gasoline fuel, and is most especially a spark-ignition internal combustion engine fuelled by gasoline fuel.

The process of the first aspect (and preferably its embodiments wherein the internal combustion engine is fuelled by gasoline fuel or biofuel or mixtures thereof, most preferably by gasoline fuel) is preferably directed to commissioning a particulate filter for a device powered by a hybrid power source comprising the internal combustion engine and one or more electric drive motors. In this aspect, the hybrid power source may preferentially comprise either (i) an internal combustion engine that provides direct drive coupling to the wheels of the vehicle, alongside one or more battery-driven electric motors available for powering the vehicle under non-engine conditions, or (ii) an internal combustion engine that operates to generate electrical charge to power the wheels of the vehicle through electric drive motors, via a battery or other charge retention device. In these hybrid embodiments, the process of the invention is particularly advantageous in that the commissioning of the particulate filter according the invention results in improved filtration efficiency particularly at higher speed and load operation where engine operation will preferentially occur, electric running of the vehicle from charge storage being favoured at lower speeds and loads such as in typical 'city' driving. In this way, the commissioning process of the first aspect finds particular suitability in such hybrid vehicles, and enables particulate emissions control to be targeted at the area of the engine operating map most relevant to such hybrids.

The particulate filters suitable to be commissioned by the process of the first aspect include those filters known in the art, most notably those based on ceramic or wire constructions. However, the process is particularly advantageous for particulate filters based on ceramic monoliths. Such filters comprise a monolith having multiple adjacent, often parallel, channels, the exhaust gas pathway through the monolith typically being constructed to exhibit counter-current flow between adjacent channels. This directed flow within the monolith drives the exhaust gas alternately up and down consecutive channels, exposing the gas to a large filtration surface area. Each channel of the monolith is sealed at its ends by plugs which prevent simple escape of the exhaust gas, and instead create resistance to propel gas through the porous walls of the channel into the bore of the next channel, filtering out carbonaceous particulate matter in so doing.

The process of the first aspect of the invention has been found to be particularly advantageous where the particulate filter in step (i) comprises a ceramic monolith, in that the metal oxide in step (ii) is observed to deposit at least in part on the uncarbonized or decarbonized surfaces of the end-plugs of the channels of the monolithic filter exposed to the gas stream. Without being bound by theory, it is believed that the accumulation of the metal oxide particles on the end plugs of the filter channels results in more effective sealing of the channel ends, and consequently a more effective lateral filtration action through the channel walls. The partial deposition of metal oxide on the end plugs also correspondingly reduces the proportion of metal oxide deposited on the side walls of the channels, so limiting the reduction in flow through the uncarbonized or decarbonized channel walls attributable to metal oxide occlusion, and providing the new or reconditioned ceramic monolith filter with a distribution of metal oxide deposits which increases its overall filtration efficiency and provides the advantageous effects of the invention.

Thus, the process of the first aspect of the invention provides a preferred embodiment wherein the particulate filter in step (i) comprises a ceramic monolith and the metal oxide deposit formed in step (ii) accumulates at least in part on the uncarbonized or decarbonized surfaces of the end-plugs of the channels of the monolithic filter exposed to the gas stream.

This preferred embodiment is particularly favoured in combination with devices powered by internal combustion engines fuelled by gasoline fuel or biofuel, or mixtures thereof, and more particularly engines fuelled by gasoline fuel, in particular where the device is powered by a hybrid power source comprising the engine and one or more electric drive motors.

In a second aspect of the invention, the present invention accordingly provides the commissioned particulate filter obtainable by, and preferably obtained by, the process of the first aspect of the invention. Without wishing to be bound by theory, the commissioned particulate filter may be described as comprising metal oxide on the surface of the end-plugs of the channels of the filter which is preferably a ceramic monolith filter. Accordingly, in an embodiment of the second aspect of the present invention, the commissioned particulate filter comprises a ceramic monolith comprising one or more accumulations of metal oxide deposit at least in part on the surfaces of the end-plugs of the channels of the monolithic filter. Preferably, the surfaces of the end-plugs of the channels of the monolithic filter are uncarbonized or decarbonized.

In steps (i) and (ii) of the process of the first aspect, a gas stream is passed through the uncarbonized new, or decarbonized reconditioned, particulate filter to be commissioned, into which is released the flow of metal oxide particles. This gas stream follows the flow pathway through the filter to be adopted by the engine exhaust gas once the filter and device are in service, the metal oxide particles being released into this gas stream upstream of the filter.

In the first embodiment of the first aspect, wherein commissioning steps (i) and (ii) are conducted with the particulate filter installed in its operating position in the exhaust system of the device of step (iii), any suitable gas stream and flow rate may again be used as an initial commissioning treatment, the gas stream being connected and disconnected for the purpose prior to regular operation of the device in service.

However, in this first embodiment, it is preferred that the gas stream of commissioning steps (i) and (ii) is the exhaust gas stream emitted from the internal combustion engine of the device when first operated after installation of the particulate filter. In this latter embodiment, it is further preferred that the metal oxide particles used in commissioning step (ii) are released into this exhaust gas stream upstream of the particulate filter either:
  (a) by addition of the metal oxide or a precursor thereof to the engine fuel in a form which, upon combustion of the fuel, releases metal oxide particles into the exhaust gas stream emitted from the combustion chamber; or
  (b) by direct release of the metal oxide particles into the exhaust gas stream.

In alternative (a) of the above embodiment, wherein the engine fuel is a liquid hydrocarbonaceous fuel untreated with lubricating oil, the metal oxide or precursor thereof is preferably added to a single quantity of the fuel in the form of a fuel additive that disperses the metal oxide or precursor in the liquid fuel.

The fuel additive may be added to the liquid fuel in various ways. In a first embodiment, the fuel additive is added to the liquid fuel to form a commissioning fuel composition before being placed in the fuel system of the device. This fuel composition may then be placed into the fuel tank of the device, or placed or drawn into the fuel line between the tank and the engine, ready for commissioning to start. In a second embodiment, the fuel additive may be added to the fuel tank of the device in the form of a liquid dispersion or tablet which disperses in the liquid fuel placed therein to form the commissioning fuel composition in situ in the fuel tank. Such ways of constituting fuel compositions are known in the art, and typically involve blending or mixing by agitation.

In alternative (a), the fuel additive preferably comprises the metal oxide or precursor stabilized by one or more organic compounds in the form of a dispersion in a hydrocarbonaceous diluent; and the fuel additive does not contain any lubricating oil or other, heavier petroleum fraction or additives originating therefrom.

In these embodiments of alternative (a), following installation of the particulate filter, the internal combustion engine is initially operated on a single quantity of the fuel containing the fuel additive, this constituting the commissioning steps (i) and (ii) of the process; and is thereafter consigned to operate in service on fuel not containing the fuel additive, such that the filter thereafter operates on exhaust gas not containing metal oxide particles originating from the fuel, and so may be alternatively stated herein as operating the particulate filter on the exhaust gas emitted from the internal combustion engine of the device in service. The initial operation of the internal combustion engine is irrespective of whether the engine is operated on one continuous occasion or on multiple occasions to consume the single quantity of fuel containing the fuel additive, either representing a single period of release in accordance with the present invention, although it is preferable that the single period of release is one continuous operation of the internal combustion engine.

It is preferred in these embodiments that the single quantity of fuel is no more than that required to fill the on-board fuel tank of the device. Thus, the invention serves to provide a commissioning process that can be conducted using a single tankful (or less) or fuel, in which a commissioning fuel composition containing the fuel additive is initially run in the device to commission the particulate filter, and regular service fuel without the same fuel additive thereafter employed. This commissioning fuel composition can be added to the device at its point of manufacture and the commissioning process run before distribution, or alternatively run in the course of its initial distribution or before sale, or in the course of its first operation(s) after sale, without additional measures being required. The device and its particulate filter is thereafter ready for long-term service.

In alternative (b) of the above embodiment, the metal oxide particles may be released into the exhaust gas stream directly via a feed from a remotely-mounted particle reservoir. This reservoir can be connected or attached permanently to the vehicle, or attached for the purpose of commissioning and then removed. The metal oxide particles are preferably released into the exhaust gas stream by an injection device mounted in the wall of the exhaust system, the injection device preferably fed from the particle reservoir by means of a mechanical or electronic pump or suction device. The metal oxide particles may be fed either in discrete solid form, or dissolved or suspended in a solvent which evaporates upon exposure to exhaust gas to release the particles in discrete solid form.

More preferably, in alternative (b) of the above embodiment, the metal oxide particles are released into the exhaust gas stream directly from a particle reservoir mounted in the exhaust system upstream of the particulate filter and opening into the bore of the exhaust system. In this embodiment, it is preferred that the particle reservoir takes the form of a vessel mounted proximal to the upstream end of the particulate filter. In operation, this vessel is pre-loaded with metal oxide particles, with release effected by the onset of commissioning which may take place before the vehicle leaves the factory or workshop.

In the second embodiment of the first aspect, wherein commissioning steps (i) and (ii) are conducted on the particulate filter before it is installed in its operating position in the exhaust system of the device, the gas stream serves as a transport medium for entraining the metal oxide particles and carrying them into the filter during commissioning, and may be any gas stream suitable in the art for entraining such solid particles. Suitable examples of gases include air, nitrogen and inert gases such as helium. The flow rate of such a gas stream will be selected by the skilled engineer as one which is sufficient to transport the chosen solid particulate material into the particulate filter, and may usefully correspond to those flow rates typical of spray coating or substrate impregnation, or alternatively correspond to the typical flow rates of exhaust gas through a particulate filter in service, and be adjusted accordingly by the skilled person.

In this embodiment, the metal oxide particles may be released into the gas stream from a storage vessel or device (herein termed "particle reservoir"), this reservoir being directly positioned in the gas line feeding the particulate filter, or being placed in communication therewith via intermediate apparatus. The metal oxide particles are released over a single period, so providing a concentrated, finite flow of metal oxide particles through the particulate filter that effects the commissioning.

In a preferred form of this embodiment, the particulate filter is firstly attached to a gas line downstream of a gas stream source remote from the device, step (i) thereafter being conducted with a gas stream other than engine exhaust gas from the device; wherein the metal oxide particles used in step (ii) are released directly into this gas stream, upstream of the particulate filter; and wherein, in step (iii), the particulate filter is detached from the remote gas line and positioned operationally in the exhaust system of the device.

In this embodiment, it is preferred in step (ii) that the metal oxide particles are either released into the gas stream directly via a feed from a remotely-mounted particle reservoir, or released into the gas stream directly from a particle reservoir mounted upstream of the particulate filter and opening into the bore of the gas line.

A third aspect of the invention accordingly provides an uncommissioned particulate filter assembly for use in the above embodiment, comprising a particulate filter and a metal oxide particle reservoir in the form of a vessel mounted proximal to the upstream end of the filter, the vessel further having means for providing a single discharge of particles therefrom into the bore of the inlet pipe to the particulate filter when placed in a commissioning gas stream.

The means for providing a single discharge of the metal oxide particles from the vessel may be varied by the skilled person to suit the exhaust system of the device in question. Thus, in one embodiment, the discharge means may be a mechanical or electronic flap or valve mechanism, the particles residing in free particulate form inside the vessel and being released upon its opening. In an alternative embodiment, the discharge means may be a particle-retaining matrix such as wax or particle-retaining surface, such as an adhesive layer, the metal oxide particles being retained by this matrix or surface until conditions inside the exhaust system or other trigger cause the matrix or layer to lose its retaining power, for example by melting in response to rising exhaust gas temperature, so releasing the metal oxide. In an alternative embodiment, where the metal oxide employed displays magnetic properties (such as iron oxide particles), the discharge means may be the release of a magnetic field retaining the metal oxide particles in the vessel, thus causing their discharge into the exhaust line. The vessel in the assembly is preferably equipped with a flap or valve mechanism which opens to release the metal oxide particles into the commissioning gas stream, this release mechanism preferably being triggered by engine start-up or the steady flow of exhaust gas.

The above vessel, equipped with any of the above-mentioned discharge means, may be any suitable receptacle for the metal oxide particles to be released. However, preferably the vessel takes the form of an annular vessel mounted proximal to the upstream end of the particulate filter. The annular nature of the vessel ensures a circumferentially-dispersed release of the metal oxide particles into the bore of the exhaust line leading to the filter, so providing a more regular distribution of the metal oxide within the exhaust gas, and hence into the body of the particulate filter.

This particulate filter assembly of the third aspect provides the advantage of a self-contained, self-commissioning filter unit that can be replenished with metal oxide particles when reconditioned and thereafter left in place on the vehicle without detriment to space utilisation elsewhere on the vehicle. The particle reservoir can optionally by adapted in conformation such that, once open, it contributes in service to managing exhaust gas flow into the particular filter, or serves ancillary functions such as providing an extra fixed-bed catalytic surface upstream of the filter to improve control of gaseous emissions.

In a fourth aspect, therefore, the present invention provides a commissioning fuel composition for initial use in a device installed with an uncommissioned particulate filter in the exhaust system of its internal combustion engine, the fuel composition being untreated with lubricating oil and/or additives originating therefrom, and comprising:
  (a) a hydrocarbonaceous liquid selected from diesel or gasoline petroleum fuel, or biofuel, or mixtures thereof, and
  (b) a fuel additive comprising metal oxide or precursor stabilized by one or more organic compounds in a hydrocarbonaceous dispersion, the fuel additive not containing any lubricating oil or other, heavier petroleum fraction or additives originating therefrom.

In addition to the components (a) and (b) above and the absence of lubricating oil and/or additives therefrom, the commissioning fuel composition of the invention is one suitable to promote or protect the initial running-in of the engine in the device, and protect the fuel system from the potential problems seen in in long-term storage as may be experienced, for example, by newly-manufactured devices awaiting distribution and sale. Thus, the commissioning fuel composition may additionally comprise additives providing protection against initial wear, corrosion, oxidative degradation, water contamination and sedimentation to a higher level than service fuels (such as those sold at service stations) that are not subject to the same long-term storage and other pre-sale considerations.

Thus, in a preferred embodiment, the commissioning fuel composition, additionally comprises one or more anti-wear, anti-corrosion, anti-oxidation, anti-agglomeration and demulsification agents, commonly in the form of chemical additives, to a protection level suitable for devices subject to the rigours of long-term storage and distribution by land and sea.

In a fifth aspect, the present invention provides the use of the fuel composition of the fourth aspect comprising the fuel additive (b) as defined therein, in a device powered in whole or in part by an internal combustion engine, as the initial fuel for engine operation upon installation of a particulate filter to the exhaust system thereof, to commission the particulate filter by improving its filtration efficiency towards hydrocarbonaceous particulate emissions over the period of engine operation on said initial fuel, prior to the device being consigned to operate in service on fuel not comprising the fuel additive (b). This fifth aspect may additionally or alternatively be a method of use of the fuel composition, the use as described above and the method comprising the step of operating the internal combustion engine with the particulate filter installed to the exhaust system thereof utilising the initial fuel.

In a sixth aspect, the present invention provides the use of the fuel additive (b) comprising metal oxide or precursor thereof stabilized by one or more organic compounds in a hydrocarbonaceous diluent, the fuel additive not containing any lubricating oil or other, heavier petroleum fraction or additives originating therefrom, to provide the commissioning fuel composition of the fourth aspect or used in the fifth aspect. This sixth aspect may additionally or alternatively be a method of use of the fuel additive, the use as described above and the method comprising the step of adding the fuel additive to a hydrocarbonaceous liquid which may be selected from diesel of gasoline petroleum fuel, or biofuel, or mixtures thereof.

The essential metal oxide or precursor comprised in the fuel additive (b) is preferably one or more compounds of rare earth metals such as cerium, or one or more transition metals such as iron or manganese, or one or more platinum group metals, or mixtures thereof. Preferably, the essential metal oxide or precursor thereof is one or more compounds of rare earth metals or transition metals, or mixtures thereof, preferably in the form of colloidally dispersions thereof.

In the context of this invention, the term "precursor" should be understood to mean a metallic compound that chemically converts or reacts to form the metal oxide under engine combustion chamber conditions, such that the exhaust gas emitted from the engine contains the requisite metal oxide for commissioning the particulate filter. Thus, as precursors, organometallic compounds or complexes of the above metals, that combust to metal oxide and other combustion products, are suitable in the invention. As examples, organometallic complexes of iron such as ferrocene, diferrocene, iron carboxylates or other salts, or mixtures thereof can be employed. The fuel additive may be an organometallic compound or complex comprising any of the above mentioned metals, and preferably comprising iron and/or cerium, more preferably iron.

Preferably, however, the metal compound(s) within the fuel additive will be metal oxide. In this respect, the invention preferably employs metal compound(s) comprising at least one rare earth oxide, or at least one of an iron oxide, or mixtures thereof, preferably in the form of a colloidal dispersion thereof. More preferably, the metal compound comprises one or more cerium oxides or iron oxides or mixtures thereof.

The fuel additive even more preferably consists of a colloidal dispersion of iron oxide or cerium oxide, or mixture thereof. Most preferably, the fuel additive consists of iron oxide colloidally dispersed by one or more organic compounds in a hydrocarbonaceous solvent.

In the preferred embodiments employing colloidal dispersions of iron oxide, and particularly the most preferred embodiment consisting of colloidal iron oxide, the iron oxide may be crystalline or amorphous, although preferably it is crystalline. In this context, the terms "crystalline" and "amorphous" used in relation to the iron oxide (forming the core of the colloid) have defined meanings. The core is crystalline if, under X-Ray diffraction of the colloid, one or more sharp peaks are observed which are attributable to the existence of a defined crystal structure or lattice within its core. The core is amorphous if no such attributable peaks are observed.

A suitable protocol for conducting the required X-Ray diffraction of the colloid is firstly to prepare the sample for scanning by applying the relevant liquid (colloid) directly onto a silicon low background substrate, and allowing the sample to dry. The sample forms a viscous tacky film which can then be investigated. Suitable X-Ray data can be collected from 2-70 degrees 2 theta on a Philips PW1800 automatic powder X-ray diffractometer using Copper K alpha radiation generated at 40 kV and 55 mA, and a 4 second per point count time.

Iron oxide itself can exist in a variety of forms dependent upon the oxidation state (or mixture of oxidation states) of the iron therein, and the conditions to which it has been exposed. In this context, the term "iron oxide" is used generically to mean both true iron oxides and also iron hydroxides and iron oxide-hydroxides generally referred to in the art under the term 'iron oxide'. Most preferably, no metals other than iron are present within the iron oxide, and the colloid core consists of iron as the only metal, in combination with oxygen and/or hydrogen depending upon the precise form(s) of iron oxide present.

It is most preferred that the iron oxide particles within the colloid consist essentially of crystalline form(s) of iron oxide. Such crystalline forms of iron oxide specifically include the oxides magnetite ($Fe_3O_4$), hematite ($\alpha$-$Fe_2O_3$) and maghemite ($\gamma$-$Fe_2O_3$) as well as other iron (III) oxide forms such as the iron (II) oxide "Wustite FeO". Of these true oxides, magnetite, hematite and maghemite are preferred, with magnetite being most preferred. Magnetite and hematite in particular can be mined in ore form in large quantities.

Crystalline forms of iron hydroxides and iron oxide-hydroxides specifically include goethite ($\alpha$-FeOOH) and lepidocrocite ($\gamma$-FeOOH) as well as the $\delta$-FeOOH (synthetic) and $\delta'$-FeOOH (mineral) forms, ferrihydrite $Fe_5O_8 \cdot 4H_2O$, bernalite $Fe(OH)_1$ and $Fe(OH)_2$. Goethite in particular is a thermodynamically stable form and is available in rocks and ochre deposits. Lepidocrocite occurs in rocks and soils, and ferrihydrite is widespread in natural surface environments. Of the iron hydroxides and iron oxide-hydroxides, the goethite and lepidocrocite forms are most preferred.

Preferably, from a performance point of view, the crystalline iron oxide core of the colloid consists essentially of the crystalline form magnetite, optionally also incorporating lesser quantities of one or more of the hematite, maghemite, goethite or lepidocrocite forms. A core consisting of magnetite is the most preferred form of crystalline iron oxide for use in the present invention, optionally in combination with goethite.

The metal oxide, and particularly the cerium oxide or most preferably, iron oxide core (whether crystalline or amorphous) is dispersed within a hydrocarbonaceous solvent by a dispersing means, preferably an organic dispersing means, preferably being one or more carboxylic acids. It is preferred that at least one of the acids is a hydrocarbyl-substituted dicarboxylic acid containing between 8 and 200 carbon atoms, and wherein any additional carboxylic acids are either aliphatic monocarboxylic acids containing between 8 and 20 carbon atoms, or hydrocarbyl-substituted dicarboxylic acids containing between 8 and 200 carbon atoms, or mixtures thereof. Preferably, the weight ratio of carboxylic acid(s):metal in the colloid (measured as the total weight of acid compound(s):weight of elemental metal contained within the metal oxide particles) is in the range of 6:1 to 1:4. Most preferably, the metal is cerium or iron, most preferably iron.

In a preferred embodiment the dispersing means within the colloid consists of one or more hydrocarbyl-substituted dicarboxylic acids containing between 8 and 200 carbon atoms. Preferably, the or each hydrocarbyl-substituted dicarboxylic acid is a hydrocarbyl-substituted succinic acid, more preferably an alkenyl or polyalkenyl succinic acid, preferably a polyalkenyl succinic acid.

As used herein, the term 'hydrocarbyl substituent' means a monovalent chemical substituent having hydrocarbonaceous character, and consisting of carbon and hydrogen atoms (and optionally heteroatoms such as oxygen, nitrogen and sulphur, provided that the presence of such heteroatoms does not affect the hydrocarbonaceous character of the substituent). In each of the preferred embodiments of the dicarboxylic acid, the hydrocarbyl substituent consists of carbon and hydrogen atoms (only), wherein the hydrocarbyl substituent is preferably a monovalent saturated (i.e. alkyl), or more preferably mono or poly-unsaturated substituent, such as alkenyl. Branched chain substituents are preferred.

The preferred maximum size of such the hydrocarbyl substituents is 160 carbon atoms, preferably 80 carbon atoms. Preferably, the substituents contain at least 12 carbon atoms, and more preferably at least 18 carbon atoms. Branched-chain substituents, and especially alkenyl or polyalkenyl substituents, containing between 18 and 80 carbon atoms are most preferred.

Preferably, a mixture of hydrocarbyl-substituted dicarboxylic acids is used to disperse the metal oxide. More preferably, the mixture is a mixture of dicarboxylic acids wherein each acid is an alkenyl- or polyalkenyl-substituted succinic acid and wherein the mixtures preferably consist essentially of (and more preferably consist of) succinic acids which carry only one branched-chain polyalkenyl substituent, preferably containing between 18 and 80 carbon atoms.

In this latter preferred embodiment, the substituent on each succinic acid may be derived from polymerized olefins, such as polyethylene, polypropylene or (preferably) polybutylene such as polyisobutene. A preferred substituent is derived from polyisobutene of number average molecular weight (as measured by gel permeation chromatography ('GPC') against polystyrene standards) in the range of 450 to 2250, preferably 750 to 1300. Such polyisobutenes can be made by conventional polymerisation techniques known in the art, and thereafter attached to maleic anhydride via well-known chlorination or thermal reaction routes to give the preferred polyisobutenyl-succinic acid(s).

A further preferred embodiment of the present invention is that wherein the dispersing means consists of one or more aliphatic-substituted succinic acids derived from the structure (II):

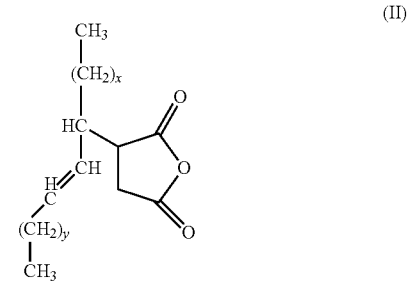

wherein x and y are independent integers whose sum is 1 to 30, preferably 9 to 29, more preferably 11 to 21, and most preferably 11 or 13. Mixtures of such materials may again be derived from the maleation of a mixture of internal olefins of different chain lengths, or from maleation of an isomeric mixture of internal olefins of the same chain length. The internal olefins may be generated in situ by the acid-catalysed isomerisation of terminal olefins, prior to reaction with the maleic anhydride.

In another preferred embodiment of the invention, the dispersing means within the colloid consists of one or more hydrocarbyl-substituted dicarboxylic acids containing between 8 and 200 carbon atoms in combination with one or more monocarboxylic acids containing between 8 and 20 carbon atoms. In this embodiment, the preferred embodiments previously described for the hydrocarbyl-substituted dicarboxylic acids may suitably be combined with one or more of the above-stated monocarboxylic acids.

Thus, one or more monocarboxylic acids containing between 8 and 20 carbon is atoms may be combined with one or more hydrocarbyl-substituted dicarboxylic acids containing between 8 and 200 carbon atoms, wherein the or each hydrocarbyl-substituted dicarboxylic acid is preferably a hydrocarbyl-substituted succinic acid, more preferably an alkenyl succinic acid or most preferably a polyalkenyl succinic acid.

In such mixtures, the preferred maximum size of such hydrocarbyl substituents is 160 carbon atoms, preferably 80 carbon atoms. Preferably, the substituents contain at least 12 carbon atoms, and more preferably at least 18 carbon atoms. Branched-chain substituents, and especially alkenyl or polyalkenyl substituents, containing between 18 and 80 carbon atoms are most preferred.

Preferably, a mixture of hydrocarbyl-substituted dicarboxylic acids is used in such a mixture. More preferably, each acid in the mixture is an alkenyl- or polyalkenyl-substituted succinic acid and wherein the mixtures consist essentially of (and preferably consist of) succinic acids which each carry only one branched-chain polyalkenyl substituent, preferably containing between 18 and 80 carbon atoms.

In this latter preferred embodiment, the substituent on each succinic acid may be derived from polymerized olefins, such as polyethylene, polypropylene or (preferably) polybutylene such as polyisobutene. A preferred substituent is derived from polyisobutene of number average molecular weight (as measured by gel permeation chromatography ('GPC') against polystyrene standards) in the range of 450 to 2250, preferably 750 to 1300. Such polyisobutenes can be made by conventional polymerisation techniques known in the art, and thereafter attached to maleic anhydride via well-known chlorination or thermal reaction routes to give the preferred polyisobutenyl-succinic acid(s).

A further preferred embodiment is that obtained by employing, in combination with the one or more carboxylic acids, one or more aliphatic-substituted succinic acids derived from the structure (II):

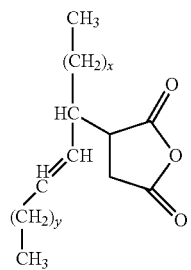

(II)

wherein x and y are independent integers whose sum is 1 to 30, preferably 9 to 29, more preferably 11 to 21, and most preferably 11 or 13. Mixtures of such materials may again be derived from the maleation of a mixture of internal olefins of different chain lengths, or from maleation of an isomeric mixture of internal olefins of the same chain length. The internal olefins may be generated in situ by the acid-catalysed isomerisation of terminal olefins, prior to reaction with the maleic anhydride.

Thus, in this embodiment, the dispersing means within the colloid preferably consists of one or more polyalkenyl-substituted succinic acids in combination with one or more aliphatic monocarboxylic acids containing between 8 and 20 carbon atoms. Preferably, the or each monocarboxylic acid contains between 10 and 18 carbon atoms. Such acids may be straight or branched chain acids, and include saturated straight chain acids such as decanoic acid, dodecanoic acid, tetradecanoic acid, hexadecanoic acid and octadecanoic (stearic) acid, as well as mixtures thereof; saturated branched chain acids such as neodecanoic acid and isostearic acid; and furthermore include monounsaturated acids such as cis-9-hexadecenoic (palmitoleic), cis-6-octadecenoic (petroselinic), cis-9-octadecenoic (oleic), cis-11-octadecenoic (cis-vaccenic) and cis-15-tetradecenoic (nervonic) acids, and polyunsaturated fatty acids such as 9,12-octadecadienoic (linoleic), 6,9,12-octadecatrienoic (γ-linoleic) and 9,12,15-octadecatrienoic (α-linoleic) acids. Of these acids, the unsaturated acids are preferred, with oleic acid per se, or mixtures consisting essentially of oleic acid, being most preferred as the dispersing means for the colloid.

In a particularly preferred embodiment, said dispersing means within the colloid consists of oleic acid and one or more polyisobutenyl succinic acids, the polyisobutenyl group(s) of which have a number average molecular weight (as measured by gel permeation chromatography, against polystyrene standards) of between 450 and 2300.

Most preferably in the invention, the dispersing means within the colloid preferably consists of one or more polyisobutenyl-substituted succinic acids in combination with one or more aliphatic monocarboxylic acids containing between 10 and 18 carbon atoms. The combination of oleic acid and a mixture of polyisobutylene-substituted succinic acids, wherein the polyisobutylene substituents have a number average molecular weight (as measured by GPC) in the range of 700 to 1300, and particularly the range of 900-1000, is most preferred.

It is particularly preferred in the invention that the above mixtures of monocarboxylic acids and hydrocarbyl-substituted dicarboxylic acids form the dispersing means for particles which consist essentially of crystalline form(s) of cerium oxide and/or iron oxide, more preferably iron oxide, and especially which consist essentially of magnetite.

In the invention, the weight ratio of carboxylic acid(s):metal in the colloid (measured as the weight of acid compound(s) weight of elemental metal contained within the metal oxide particles) is in the range of 6:1 to 1:4. Preferably, this weight ratio is in the range of 4:1 to 1:2, more preferably 2:1 to 1:2. Most preferably, this weight ratio is in the range of 1.5:1 to 1:2. It is most preferred that this metal is iron.

The fuel additive can be made to concentration levels suitable for use in bulk fuel manufacture or blending operations at refineries or fuel terminals. In such concentrates, the fuel additive is typically present in concentrations containing from 1 to 30% metal by weight, and preferably between 4 and 25%, more preferably between 10 and 25% by weight, and most preferably between 12 and 25% by weight, per weight of fuel additive.

Additionally, the fuel additive of the invention can be made to high concentration levels suitable for use in small quantities of the commissioning fuel composition, particularly where commissioning should be achieved by a single tankful or less of fuel. In such concentrated additive, the dispersed metal oxide or precursor is typically present in concentrations providing up to 40% metal by weight, and preferably between 10 and 30%, more preferably between 15 and 25% by weight, per weight of additive.

Suitable hydrocarbonaceous solvents for the colloid include aromatic solvents such as the commercial mixed aromatic solvents Solvesso™ and Shellsol™, and aliphatic solvents such as isoalkanes, including Isopar™ L. Other suitable solvents known in the additives art may be used, such as Norpar™ (pentanes), Exxsol™ (dearomatized hydrocarbon fluids), Nappar™ (naphthenics), Varsol™ (non-dearomatized hydrocarbon fluids), xylenes, and HAN 8080™ (aromatic solvent).

The concentration of fuel additive and hence metal oxide deployed in the commissioning fuel under all aspects of the present invention will be that desired by the skilled person to provide the desired degree of commissioning. This will be governed by the emissions target for the device in question. Typically, these factors will allow the skilled person to set the level of metal (preferably iron) in the commissioning fuel composition that corresponds to the desired accumulation of metal oxide in the filter, based on the desired filtration efficiency for hydrocarbonaceous particulates. Typically, such levels are set during engine or exhaust system development and as a result of routine optimisation. As explained in the worked examples, the filtration efficiency of a particulate filter can be readily measured, and routine tests conducted varying the amount of metal oxide required to achieve the desired increase in efficiency in a particulate filter of specific design for a particular device. This amount of metal oxide is then stipulated as the appropriate treatment level, and then translated into the amount of additive to be added to the fuel, depending on the quantity of fuel to be used in the commissioning process.

However, for general purposes, the desired amount of metal oxide accumulation in the particulate filter will be in the range of 0.5 to 4.0 grams of metal oxide per litre of particulate filter gaseous capacity, preferably in the range of 1.0 to 3.3 grams of metal oxide per litre of particulate filter gaseous capacity, and more preferably 1.5 to 3.0 grams of metal oxide per litre of particulate filter gaseous capacity. Thus, for illustration, a particulate filter having a gaseous capacity of 2 litres (i.e. a total internal filtration channel gas volume of 2 litres) would require a total accumulation therein of 6.0 grams of metal oxide in order to meet a target of 3.0 grams per litre of filter gaseous capacity. The skilled person will accordingly add the corresponding amount of metal oxide into the commissioning fuel composition in order to effect commissioning to the desired accumulation level.

Analogously, where the metal oxide in step (ii) is not added via the fuel, the appropriate amount of metal oxide accumulation will be set by routine testing determining the amount of metal oxide required to achieve the desired increase in efficiency in a particulate filter of specific design for a particular device. This amount of metal oxide is then stipulated as the appropriate treatment level for direct addition to the gas flow during step (ii) of the commissioning process. However, for general purposes, the desired amount of metal oxide accumulation in the particulate filter will again be in the range of 0.5 to 4.0 grams of metal oxide per litre of particulate filter gaseous capacity, preferably in the range of 1.0 to 3.3 grams of metal oxide per litre of particulate filter gaseous capacity, and more preferably 1.5 to 3.0 grams of metal oxide per litre of particulate filter gaseous capacity. Thus, for illustration, a particulate filter having a gaseous capacity of 2 litres (i.e. a total internal filtration channel volume of 2 litres) would require a total accumulation therein of 6.0 grams of metal oxide in order to meet a target of 3.0 grams per litre of filter gaseous capacity. The skilled person will accordingly add the requisite amount of metal oxide direct into the gas flow during step (ii) of the commissioning process to effect the desired accumulation level.

The commissioning fuel to be treated with the fuel additive may be a petroleum-based diesel fuel oil. Such diesel fuel oils generally boil within the range of from 150° C. to 400° C. The fuel oil may comprise atmospheric distillate or vacuum distillate, cracked gas oil, or a blend in any proportion of straight run and thermally and/or refinery streams such as catalytically cracked and hydro-cracked distillates. The diesel fuel may be a fuel for a road vehicle. Such fuels are typically classified in Europe by various well-known industry standards and can contain low or very low sulphur contents, such as at most 50 ppm sulphur, or even at most 10 ppm of sulphur or less by weight, per weight of fuel.

The fuel may alternatively be a marine diesel fuel, in particular having one or more of the following characteristics:

a 95% distillation point (ASTM D86) of greater than 330° C., preferably greater than 360° C., more preferably greater than 400° C., and most preferably greater than 430° C.;

(ii) a cetane number (measured by ASTM D613) of less than 55, such as less than 53, preferably less than 49, more preferably less than 45, most preferably less than 40;

(iii) an aromatic content of greater than 15% mass, preferably greater than 25% mass and more preferably greater than 40% mass;

(iv) a Ramsbottom carbon residue (by ASTM D 524) of greater than 0.01% mass, preferably greater than 0.15% mass, more preferably greater than 0.3% mass, such as 1% or 5% mass, and most preferably greater than 10% mass; and (v) a maximum sulfur content (as defined by IMO 2020) of 0.5% mass of sulfur in the absence of an onboard scrubber, and preferably a maximum of 0.1% mass of sulfur.

Such diesel fuels (and particularly such marine diesel fuels) may in particular contain streams such as streams produced from fluid catalytic cracking, such materials usually having a density @ 15° C. of 850 to 970, such as 900 to 970 kg/m$^3$ and characterized by low octane number values, typically ranging from 10 or lower to around 30 to 35; from thermal cracking processes, like visbreaking and coking, such streams typically having a density range @ 15° C. of 830 to 930 kg/m$^3$ and a cetane value of 20 to 50; and from hydrocracking that uses severe conditions, e.g. temperature in excess of 400° C. coupled with pressures of 130 bars or greater, to produce streams characterized by cetane number from 45 to 60 and having a density range 15'C from 800 to 860 kg/m$^3$.

Typically, marine fuels accord with the standard specification ASTM D-2069 and may be either distillate or residual fuels as described within that specification, and may in particular have sulfur contents as defined by International Standard ISO 8217, and preferably 0.5% mass of sulfur, more preferably a maximum of 0.1% mass of sulfur.

Other examples of diesel fuel oils include Fischer-Tropsch fuels. Fischer-Tropsch fuels, also known as FT fuels, include those described as gas-to-liquid (GTL) fuels, biomass-to-liquid (BTL) fuels and coal conversion fuels or coal-to-liquid (CTL) fuels. To make such fuels, syngas (CO+$H_2$) is first generated and then converted to normal paraffins by a Fischer-Tropsch process. The normal paraffins may then be modified by processes such as catalytic cracking/reforming or isomerization, hydrocracking and hydrodimerization to yield a variety of hydrocarbons such as iso-paraffins, cyclo-paraffins and aromatic compounds. The resulting FT fuel can be used as such or in combination with other fuel components and fuel types to arrive at a fuel suitable for use as diesel fuel.

The fuel may be biofuel, i.e. fuel derived from animals and/or plant material, and preferably derived from fats and oils of plant or animal material, such as rapeseed oil, coriander oil, soyabean oil, cottonseed oil, sunflower oil, castor oil, olive oil, peanut oil, maize oil, almond oil, palm kernel oil, coconut oil, mustard seed oil, jatropha oil, beef tallow and fish oils. Further examples include oils derived from corn, jute, sesame, shea nut, ground nut and linseed oil and may be derived therefrom by methods known in the art. Rapeseed, soya and palm oils, which are mixtures of fatty acids partially esterified with glycerol, are available in large quantities and can be obtained in a simple way by pressing from rapeseed, soya or palm. Recycled oils such as used kitchen oils are also suitable.

Also suitable are alkyl ester derivatives of the fatty acid constituents of animal and plant oils and fats. Such esters can be obtained by conventional means, for example by trans-esterification, or by saponification followed by re-esterification. Consideration may be given to the following, for example as commercial mixtures: the ethyl, propyl, butyl and especially methyl esters of fatty acids with 12 to 22 carbon atoms, for example of lauric acid, myristic acid, palmitic acid, palmitoleic acid, stearic acid, oleic acid, elaidic acid, petroselic acid, ricinoleic acid, elaeostearic acid, linoleic acid, linolenic acid, eicosanoic acid, gadoleic acid, docosanoic acid or erucic acid, which have an iodine number from 50 to 150, especially 90 to 125. Mixtures with particularly advantageous properties are those which contain mainly, i.e. to at least 50 wt % methyl esters of fatty acids with 16 to 22 carbon atoms and 1, 2 or 3 double bonds. The preferred lower alkyl esters of fatty acids are the methyl esters of oleic acid, linoleic acid, linolenic acid and erucic acid.

Commercial mixtures of the stated kind are obtained for example by cleavage and esterification of animal and vegetable fats and oils by their transesterification with lower aliphatic alcohols. For production of alkyl esters of fatty acids it is advantageous to start from fats and oils which contain low levels of saturated acids, less than 20%, and which have an iodine number of less than 130. Blends of the following esters or oils are suitable, e.g. rapeseed, sunflower, coriander, castor, soyabean, peanut, cotton seed, beef tallow etc. Alkyl esters of fatty acids based on a variety of rapeseed oil, the fatty acid component of which is derived to more than 80 wt % from unsaturated fatty acids with 18 carbon atoms, are preferred.

Whilst many of the above oils may be used as biofuels, preferred are vegetable oil derivatives, of which particularly preferred biofuels are alkyl ester derivatives of rapeseed oil, cottonseed oil, soyabean oil, sunflower oil, olive oil, or palm oil, rapeseed oil methyl ester being especially preferred.

Biofuels derived from animals and/or plants are most commonly used in combination with petroleum-derived fuels. The present invention is applicable to mixtures of such fuels in any ratio. For example, at least 2% and preferably at least 5%, more preferably at least 25%, for example more than 50% by weight of these fuel mixtures may be derived from a plant or animal source.

The commissioning fuel to be treated with the fuel additive is preferably a gasoline fuel. Such fuels generally boil within the range of from 25° C. to 240° C., more preferably 30° C. to 225° C. and are composed of a variety of compounds including saturated aliphatic compounds, unsaturated aliphatic compounds and aromatic compounds. The gasoline fuel may simply be composed of straight-run gasoline or contain the product of one or more refinery conversion or upgrading processes to blending stocks, including cracked hydrocarbon stock or reformed stock. Gasoline fuels included leaded and preferably unleaded gasoline fuels.

The gasoline fuel may also comprise synthetic blend components such as esters, alcohols, ethers and ketones, including those derived from the hereinbefore mentioned biological sources. It is common for gasoline fuels to comprise ethanol, for example ethanol complying with standard EN 15376:2014. The ethanol may be present in an amount of up to 85%, preferably from 1% to 30%, more preferably from 3% to 20%, and even more preferably from 5% to 15%, by volume of the gasoline fuel. For instance, the fuel may contain ethanol in an amount of about 5% by volume (i.e. an E5 fuel), about 10% by volume (i.e. an E10 fuel) or about 15% by volume (i.e. an E15 fuel). A fuel which is free from ethanol is commonly referred to as an E0 fuel.

The gasoline fuel is preferably a gasoline fuel for a road vehicle powered in whole or in part by a spark-ignition internal combustion engine. Such fuels are typically classified in Europe by various well-known industry standards and can contain low or very low sulphur contents, such as an average of at most 10 ppm by weight, with maximum sulfur levels no more than 80 ppm, and preferably 50 ppm, more preferably up to 10 ppm, by weight.

In some embodiments the gasoline fuel meets the requirements of EN 228, e.g. as set out in BS EN 228:2012. In other embodiments, the gasoline fuel meets the requirements of ASTM D 4814, e.g. as set out in ASTM D 4814-15a. It will be appreciated that the gasoline fuel may meet both requirements, and/or other fuel standards. For instance, the gasoline fuel oxygen content of 2.7 by mass. The gasoline fuel may exhibit one or more (such as all) of the following, e.g. as defined according to BS EN 228:2012: a minimum research octane number of 95.0 or 98.0, a minimum motor octane number of 85.0, a maximum lead content of 5.0 mg/l, a density of 720.0 to 775.0 kg/$m^3$, an oxidation stability of at least 360 minutes, a maximum existent gum content (solvent washed) of 5 mg/100 ml, a class I copper strip corrosion (3 h at 50° C.), clear and bright appearance, a maximum olefin content of 18.0% by weight, a maximum aromatics content of 35.0% by weight, and a maximum benzene is content of 1.00% by volume; and a maximum oxygenates content as specified in EN 228, e.g. methanol: 3.0% by volume, ethanol: 5.0% by volume, iso-propanol: 10.0% by volume, iso-butyl alcohol: 10.0% by volume, tert-butanol: 7.0% by volume, ethers (e.g. having 5 or more carbon atoms): 10% by volume and other oxygenates (subject to suitable final boiling point): 10.0% by volume.

In some embodiments, the gasoline fuel comprises one or more additives selected from detergents, friction modifiers/anti-wear additives, corrosion inhibitors, combustion modifiers, anti-oxidants, valve seat recession additives, dehazers/demulsifiers, dyes, markers, odorants, anti-static agents, anti-microbial agents, and lubricity improvers in respective amounts known to be efficacious to one skilled in the art and which may involve the inclusion of solvent with which any or all such additives may be combined.

In step (iii) of the process of the first aspect of the invention, the particulate filter commissioned by steps (i) and (ii) is consigned to operate on the exhaust gas emitted from the internal combustion engine of the device in service. This step ends filter operation on the gas stream deployed in steps (i) and (ii) and designates it to operate on the exhaust gas emitted by the engine of the device in service.

Where the commissioning of the filter is conducted before it is installed on the device, this transition requires designation or supply of the commissioned filter for installation onto the device for use in service. Where commissioning is conducted with the particulate filter already installed in its operating position in the exhaust system of the device, the filter is designated by operation to run on the exhaust gas emitted from the engine in regular service at completion of the single period of exposure to metal oxide deposition. Thus, in embodiments where metal oxide is released directly into the exhaust gas stream, this transition occurs automatically at the completion of the single period of release. In embodiments where metal oxide is provided via a single quantity of commissioning engine fuel, this transition occurs at the completion of engine running on that commissioning fuel and its replacement by service fuel not containing the metal oxide or precursor. In this latter respect, replacement by service fuel includes within its most general ambit replenishing the fuel tank with a first quantity of service fuel, since any residual metal oxide remaining in the commissioning fuel bottoms inside the fuel tank and/or fuel lines will subsequently pass through the engine as service fuel is consumed, until all residual metal oxide has been emptied from the fuel system. In this way, filling up with service fuel serves to 'wash through' residual metal oxide from the fuel tank and establishes the end of the single period of release, long term operation thereafter taking place on regular service fuel. Preferably, however, the amount of metal oxide remaining in the tank bottoms before filling with service fuel is insubstantial. The step of consigning the particulate filter to operate on the exhaust gas emitted from the internal combustion engine of the device in service may be followed or replaced by a step of operating the engine in service with the particulate filter in its operational position in the exhaust system, for example utilising service fuel such as service fuel that may be obtained from a service station.

In a further aspect of the invention, the present invention provides a process for operating an internal combustion engine equipped with an exhaust system having a particulate filter, the process comprising:
(a) commissioning the particulate filter according to the process of the first aspect; and thereafter
(b) operating the engine in service with the particulate filter in its operational position in the exhaust system, in the absence of further periods of deposition of metal oxide particles by the means used in the commissioning process of step (a).

In this further aspect of the invention, step (a) may advantageously be each of the preferred embodiments of the process of the first aspect described hereinbefore.

In this further aspect of the invention, step (b) does not employ further filter commissioning stages. In embodiments where commissioning step (a) takes place with the particulate filter installed in its operating position in the exhaust system of the device, this requires that no further releases of metal oxides take place into the exhaust gas stream by the means used in step (a) during that filter's operational life (or until reconditioned), either by direct release or by the periodic use in the engine of further quantities of commissioning fuel containing the metal oxide or precursor thereof.

Selected embodiments of the invention include:
1. A process for commissioning a particulate filter for the exhaust system of a device, the device being powered in whole or in part by an internal combustion engine fuelled either by a liquid hydrocarbonaceous fuel untreated with lubricating oil or by a gaseous hydrocarbonaceous fuel, the process comprising:
   (i) passing a gas stream through an uncarbonized new, or decarbonized reconditioned, particulate filter;
   (ii) releasing into the gas stream upstream of the particulate filter a flow of metal oxide particles in a single period of release sufficient to deposit metal oxide particles onto the uncarbonized or decarbonized surfaces of the channels of the filter exposed to the gas stream, and thereby obtain a measurable increase in filtration efficiency towards hydrocarbonaceous particulate emissions; and
   (iii) consigning the particulate filter to operate on the exhaust gas emitted from the internal combustion engine of the device in service.
2. The process of embodiment 1 wherein the device is a vehicle or marine vessel, or a stationary generator or plant.
3. The process according to embodiment 1 or embodiment 2 wherein the internal combustion engine is fuelled by a liquid hydrocarbonaceous fuel untreated with lubricating oil.
4. The process according to embodiment 3 wherein the internal combustion engine is fuelled by diesel or gasoline petroleum fuel, or biofuel, or mixtures thereof.
5. The process of embodiment 4 wherein the internal combustion engine is fuelled by gasoline fuel or biofuel, or mixtures thereof.
6. The process of embodiment 5 wherein the internal combustion engine is fuelled by gasoline fuel.
7. The process of any preceding embodiment, and preferably of embodiment 5 and more preferably of embodiment 6, wherein the device is a powered by a hybrid power source comprising the internal combustion engine and one or more electric drive motors.
8. The process of any preceding embodiment, and particularly of embodiment 7, wherein the particulate filter in step (i) comprises a ceramic monolith and the metal oxide deposit formed in step (ii) accumulates at least in part on the uncarbonized or decarbonized surfaces of the end-plugs of the channels of the monolithic filter exposed to the gas stream.
9. The process of any preceding embodiment wherein commissioning steps (i) and (ii) are conducted with the particulate filter installed in its operating position in the exhaust system of the device of step (iii).
10. The process of embodiment 9 wherein the gas stream of commissioning step (i) is the exhaust gas stream emitted from the internal combustion engine of the device when first operated after installation of the particulate filter, and wherein the metal oxide particles used in commissioning step (ii) are released into this exhaust gas stream upstream of the particulate filter either:
    (a) by a single direct release of the metal oxide particles into the exhaust gas stream; or
    (b) by addition of the metal oxide or a precursor thereof to a single quantity of engine fuel in a form which, upon combustion of the fuel, releases metal oxide particles into the exhaust gas stream emitted from the combustion chamber.

11. The process of embodiment 10, alternative (a) wherein the metal oxide particles are released into the exhaust gas stream directly via a feed from a remotely-mounted particle reservoir.

12. The process of embodiment 10, alternative (a) wherein the metal oxide particles are released into the exhaust gas stream directly from a particle reservoir mounted in the exhaust system upstream of the particulate filter and opening into the bore of the exhaust system.

13. The process of embodiment 12 wherein the particle reservoir takes the form of an annular vessel mounted proximal to the upstream end of the particulate filter.

14. The process of embodiment 10, alternative (b) wherein the engine fuel is a liquid hydrocarbonaceous fuel untreated with lubricating oil, and wherein the metal oxide or precursor thereof is added to a single quantity of the fuel in the fatal of a fuel additive that disperses the metal oxide or precursor in the fuel, 15. The process of embodiment 14 wherein the fuel additive comprises the metal oxide or precursor stabilized by one or more organic compounds in the form of a dispersion in a hydrocarbonaceous diluent; and wherein the fuel additive does not contain any lubricating oil or other, heavier petroleum fraction or additives originating therefrom.

16. The process of embodiment 14 or embodiment 15 wherein, following installation of the particulate filter, the internal combustion engine is initially operated on a single quantity of the fuel containing the fuel additive, this constituting the commissioning steps (i) and (ii) of the process; and is thereafter consigned to operate in service on fuel not containing the fuel additive, such that the filter thereafter operates on exhaust gas not containing metal oxide particles originating from the fuel.

17. The process of any of embodiments 14 to 16 wherein the single quantity of fuel is no more than that required to fill the on-board fuel tank of the device.

18. The process of any of embodiments 14 to 17 wherein the total deposition of metal oxide or precursor thereof on the channels of the particulate filter is in the range of 0.5 to 4.0 grams of metal oxide per litre of particulate filter gaseous capacity, preferably in the range of 1.0 to 3.3 grams of metal oxide per litre of particulate filter gaseous capacity, and more preferably in the range of 1.5 to 3.0 grams of metal oxide per litre of particulate filter gaseous capacity.

19. The process of any one of embodiments 14 to 18 wherein the fuel additive comprises a dispersion of iron oxide or cerium oxide, or mixture thereof.

20. The process of embodiment 19 wherein the fuel additive consists of iron oxide colloidally dispersed by one or more organic compounds in a hydrocarbonaceous solvent.

21. The process of any one of embodiments 14 to 18 wherein the fuel additive is an organometallic compound or complex comprising iron.

22. The process of embodiments 1 to 8 wherein commissioning steps (i) and (ii) are conducted on the particulate filter before it is installed in its operating position in the exhaust system of the device of step (iii).

23. The process of embodiment 22 wherein the particulate filter is firstly attached to a gas line downstream of a gas stream source remote from the device, step (i) thereafter being conducted with a gas stream other than engine exhaust gas from the device; wherein the metal oxide particles used in step (ii) are released directly into this gas stream, upstream of the particulate filter; and wherein, in step (iii), the particulate filter is detached from the remote gas line and positioned operationally in the exhaust system of the device.

24. The process of embodiment 23 wherein in step (ii) the metal oxide particles are either released into the gas stream directly via a feed from a remotely-mounted particle reservoir, or released into the gas stream directly from a particle reservoir mounted upstream of the particulate filter and opening into the bore of the gas line.

25. A process for operating an internal combustion engine equipped with an exhaust system having a particulate filter, the process comprising:
  (a) commissioning the particulate filter according to the process of any preceding embodiment; and thereafter
  (b) operating the engine in service with the particulate filter in its operational position in the exhaust system, in the absence of further periods of deposition of metal oxide particles by the means used in the commissioning process of step (a).

26. The process of embodiment 25 wherein step (a) is that process defined in any of embodiments 14 to 21 in which, following the commissioning steps (i) and (ii), the engine is operated in service on a liquid hydrocarbonaceous fuel untreated with lubricating oil and not containing the fuel additive defined in embodiments 14 to 21.

27. The commissioned particulate filter obtainable by, and preferably obtained by, the process of any of embodiments 1 to 24.

28. An uncommissioned particulate filter assembly for use in the process of embodiment 13, comprising a particulate filter and a metal oxide particle reservoir in the form of a vessel mounted proximal to the upstream end of the filter, the vessel further having means for providing a single discharge of particles therefrom into the bore of the inlet pipe to the particulate filter when placed in a commissioning gas stream.

29. The particulate filter assembly of embodiment 28 wherein the vessel is an annular vessel.

30. A fuel composition for initial use in a device installed with an uncommissioned particulate filter in the exhaust system of its internal combustion engine, the fuel composition being untreated with lubricating oil and/or additives originating therefrom, and comprising:
  (a) a hydrocarbonaceous liquid selected from diesel or gasoline petroleum fuel, or biofuel, or mixtures thereof, and
  (b) a fuel additive comprising metal oxide or precursor stabilized by one or more organic compounds in a hydrocarbonaceous dispersion, the fuel additive not containing any lubricating oil or other, heavier petroleum fraction or additives originating therefrom.

31. The composition of embodiment 30 wherein the fuel additive comprises a dispersion of iron oxide or cerium oxide or mixture thereof, or comprises an organometallic compound or complex comprising iron.

32. The fuel composition of embodiment 31 wherein the fuel additive consists of iron oxide colloidally dispersed by one or more organic compounds in a hydrocarbonaceous solvent.

33. The use of the fuel composition of any of embodiments 30 to 32 comprising the fuel additive (b) as defined therein, in a device powered in whole or in part by an internal combustion engine, as the initial fuel for engine operation upon installation of a particulate filter to the exhaust system thereof, to commission the particulate filter by improving its filtration efficiency towards hydrocarbonaceous particulate emissions over the period of engine operation on said initial fuel prior to the device being consigned to operate in service on fuel not comprising the fuel additive (b).

34. The use of a fuel additive comprising metal oxide or precursor thereof stabilized by one or more organic compounds in a hydrocarbonaceous diluent, the fuel additive not containing any lubricating oil or other, heavier petroleum fraction or additives originating therefrom, to provide the fuel composition of any of embodiments 30 to 32 or used in embodiment 33.

35. The use of embodiment 34 wherein the fuel additive comprises a dispersion of iron oxide or cerium oxide or both, or comprises an organometallic compound or complex comprising iron.

36. The use of embodiment 35 wherein the fuel additive consists of iron oxide colloidally dispersed by one or more organic compounds in a hydrocarbonaceous solvent.

The working of this invention can be further illustrated by the following examples.

EXAMPLES

The working of the preferred embodiment wherein the commissioning steps are conducted with the particulate filter installed in its operating position in the exhaust is system of the device, and the commissioning gas stream is the exhaust gas stream emitted from the engine of the device when first operated after installation of the particulate filter, was demonstrated in the following series of tests.

Summary of Test Method

A series of three newly-manufactured, unused gasoline particulate filters of the same type were subjected to a 3-stage test regime.

In stage 1, the three new gasoline particulate filters were individually measured for filtration efficiency and exhaust back-pressure on an engine dynamometer set-up. This represented the baseline filter function for new filters at the start of the test.

In stage 2, the filters were each installed in a gasoline road vehicle exhaust system, and thereafter operated on a single tankful of gasoline fuel. The test fuel composition was varied between filters to allow the effect of the present invention (wherein the metal oxide particles are supplied via the fuel) to be compared with untreated fuel or fuel treated with ash-providing lubricating oil additives.

In stage 3, the three filters were each removed from the vehicle, replaced in the dynamometer set-up of stage 1 and re-measured for filtration efficiency and exhaust back-pressure at the end of the test. Comparison of the results from stage 1 and stage 3 illustrated the benefits of the invention.

Stage 1—Start of Test Measurements

Each gasoline particulate filter ("GPF") was a ceramic monolith having a 1.5 litre internal volume, and was for use in the exhaust system of a commercial BMW 530i gasoline passenger car. The baseline filtration efficiency and back-pressure was measured for each new filter during stage 1. Each GPF was firstly installed on an engine test bed using a gasoline engine of 2 litre displacement and 4 cylinders, mounted with exhaust turbocharging and direct fuel injection. The measurement cycle shown in FIG. 1 was run on each GPF, and data points collected continuously throughout the test cycle through various sensors mounted in the exhaust line before and after the filter. The measurement cycle, which included a filter regeneration period at the beginning and end of each cycle to remove any carbonaceous deposit, was run twice in succession and the results from the two cycles averaged to give mean "start of test" measurements for each GPF when new and uncarbonized.

The cycle illustrated in FIG. 1 had the following conditions and timings:

| Operating Point | Information |
| --- | --- |
| Initial Heating Period | Engine speed increased to 3000 rpm/200 Nm. [0-585 seconds of test] |
| GPF Regeneration 1 | Operating point of 3500 rpm/250 Nm held [585-1495 seconds] |
| WLTC | Transient operating cycle [1495-3295 seconds] |
| Steady State Operating Point 1 | 5500 rpm/300 Nm operating point held [1495-3598 seconds] |
| Steady State Operating Point 2 | 3500 rpm/150 Nm operating point held [3598-3893 seconds] |
| Steady State Operating Point 3 | 1500 rpm/50 Nm operating point held [3893-4199 seconds] |
| GPF Regeneration 2 | Operating point of 3500 rpm/250 Nm held [4199-5107 seconds] |
| Cool to end of cycle | Ramp down, end of cycle at 5158 seconds |

The inclusion of both a transient cycle and three steady state operating points allowed filter data to be collected at the start of the test which mapped to different engine conditions for further insight into the effects of the invention.

Normal engine operating parameters were measured during the measurement cycles to ensure that each GPF was subjected to equivalent conditions. In each case the engine was run on the same 98 octane gasoline base fuel untreated with any additives.

In addition, pressure sensors positioned before and after the GPF measured the pressure difference across each GPF (mbar), to capture the back-pressure being created by the resistance in the filter to exhaust gas flow. Particle counter sensors likewise recorded particle number before and after each GPF (two separate measurements, both in 1/s) to allow the calculation of the start of test efficiency of each GPF towards particle filtration; where GPF Filtration Efficiency=(Particulate number before GPF−Particulate number after GPF)×100%

(%, calculated) Particulate number before GPF

Stage 2—Commissioning Runs

During stage 2, each filter from stage 1 was installed into the exhaust system of a BMW 530i passenger car powered by a 2 litre 4-cylinder gasoline direct injection (GDI) engine, producing maximum power of 185 kW and torque of 350 Nm. However, each filter was then commissioned by exposure to the exhaust gas of different fuel compositions, as follows:

GPF1 (control test) was exposed to the exhaust gas of a single tankful of the same gasoline base fuel used in Stage 1, untreated with any additives.

GPF2 (invention) was exposed to the exhaust gas of a single tankful of the same base fuel treated with a colloidal iron oxide fuel additive to provide a total ash loading of 3 g litre of filter internal volume over the tankful of fuel.

GPF3 (comparative) was exposed to the exhaust gas of a single tankful of the same base fuel treated instead with the lubricant additive components of a formulated lubricating oil, to also provide a total target ash loading of 3 g/litre of filter internal volume over the tankful of fuel.

The fuel tank of the car had a 68 litre capacity. In the case of GPF I, the fuel tank of the car was simply filled with base fuel. In the cases of GPF2 and GPF3, the fuel tank was firstly filled with 34 litres of the gasoline base fuel, before the appropriate additive was added to the fuel tank, pre-mixed in 5 litres of the same base fuel. The fuel tank was then filled to capacity with more base fuel in each case, the resulting agitation causing the additives to become thoroughly dispersed within the fuel tank.

A total 4.5 g (or 3 g/litre, given the GPFs were 1.5 litre capacity) of metal oxide/salt deposit was targeted for GPF deposition when dosing additives into the fuel.

The fuel additive used with GPF2 in the example of the invention consisted of iron oxide colloidally stabilized by PIBSDA (polyisobutylene succinic diacid) in a hydrocarbonaceous solvent. Specifications for the iron oxide fuel additive were:

| | |
|---|---|
| Iron Content (% mass of metal) | 12 |
| Kinematic Viscosity at 40° C. (cSt) | 4 |
| Density at 15° C. (kg/m$^3$) | 944 |

The theoretical value of iron needed to provide 4.5 g of iron oxide was 3.15 g, which corresponded to 26.25 g of the additive after taking account of its solvent dilution. Therefore, to dose 4.5 g total ash into GPF2, 26.25 g of the fuel additive was added to the fuel.

GPF3 was treated with a complete lubricant additive package. This comparative example represented the prior art solution of dosing the fuel with formulated lubricating oil, but was modified by the exclusion of the lubricating base-oil to avoid the other negative effects of heavy hydrocarbons (such as gummy deposits on engine critical surfaces) which might otherwise interfere with the interpretation of results. Thus, the test in GPF3 focused on the impact of metal ash deposition from the complete lubricant additive package that was added to the test base fuel.

TGA (thermogravimetric analysis) was used to establish the metal ash content of the lubricant additive package for dosing purposes, with the residue % remaining being representative of the oxidized ash content. TGA was carried out using the following test method: An additive sample was analysed to determine the thermal stability within a typical TGA apparatus under an atmosphere of air. 10 mg of sample was heated at 10° C./min between 30 and 825° C. under a flow of 50 ml/min air. The pans used were Platinum. At 825° C. it is assumed that only ash from the additives remain.

Using this TGA method it was found that the lubricant additive package provided 6.8% residue. A total of 66.18 g of this additive in a concentrated form in hydrocarbonaceous solvent was added to the fuel for GPF3, to dose 4.5 g total ash into GPF3.

The lubricant additive package used in the testing of GPF3 contained the same additive components as the fresh lubricating oil being used in the engine in this series of tests. Thus, it represented the addition to the fuel of additional lubricating oil additive present in the engine, and did not result in the exposure of the engine to any additional type of chemical species.

The lubricant additive package was formulated with typical commercial lubricating oil components including metallic-based detergents, and had the following elemental analysis:

| Elemental Analysis of Lubricant Additive Package: | |
|---|---|
| SASH (%) | 8.174 |
| B (ppm) | 528 |
| Ca (%) | 2.019 |
| Cl (ppm) | 133 |
| Cu (%) | 0 |
| Mg (%) | 0.01 |
| Mo (ppm | 0 |
| N (%) | 0.7 |
| P (%) | 0.716 |
| S (%) | 1.66 |
| Si (ppm) | 48.265 |
| Zn (%) | 0.788 |

In each commissioning run, the car was driven on its tankful of fuel around the same mixed driving route of approximately 800 km length, comprising approximately equal distances of city, rural and highway driving. At the end of each tankful of fuel, the relevant GPF was carefully removed from the car and submitted for remeasuring in Stage 3, to determine the effects of the commissioning run on filtration efficiency and back-pressure across the GPF.

Stage 3—End of Test Measurements

Each gasoline particulate filter ("GPF") from stage 2 was successively re-installed on the engine test bed used in stage 1. The same pre-defined measurement cycle shown in FIG. 1 was run on each GPF, and data points again collected continuously throughout the cycle through various sensors mounted in the exhaust line before and after the filter. The measurement cycle, which included a filter regeneration period at the beginning and end of each cycle to remove any carbonaceous material deposit, was run twice in succession and the results from the two cycles averaged to give "end of test" measurements for each GPF after having been commissioned according to Stage 2.

Results

A) GPF Filtration Efficiency

FIG. 2 illustrates the results of commissioning the filters GPF1, GPF2 and GPF3. The mean filtration efficiency measured in stage 1 (before commissioning) and in stage 3 (after commissioning) for each filter is compared at each engine operating condition in the measurement cycle.

FIG. 2 firstly illustrates that significantly higher filtration efficiency results after commissioning in GPF2 than in the control test GPF1 (untreated base fuel). Thus, the commissioning process of the invention (illustrated by GPF2) improves the filtration efficiency of a particulate filter in comparison to running on conventional base fuel untreated with the iron oxide additive.

FIG. 2 secondly illustrates that GPF2 provides an improvement in filtration efficiency that is comparable to the prior art solution involving the addition of ash-creating lubricating oil additives into the fuel. At the same total ash loadings, similar filtration efficiency levels are reached. The invention thus allows the obtention of higher filtration efficiency, without the drawbacks of adding lubricant species to the fuel.

FIG. 3 expands on the results shown in FIG. 2 regarding the engine operating point of 5,500 rpm and 300 Nm torque.

The interquartile ranges indicate the differentiation in filtration efficiency seen in GPF2 and GPF3 at this operating point, resulting from the commissioning stage 2.

B) Pressure Difference Across the GPF

Pressure sensors positioned before and after the GPF were used to measure the pressure difference, and hence the degree of back-pressure building up in a particular GPF sample. A higher pressure difference indicates a greater degree of resistance to gas flow through the GPF, attributable to a higher degree of obstruction of the porous walls of the filter channels.

FIG. 4 illustrates the mean GPF filtration efficiency and mean pressure difference across each GPF at the engine operating point of 5,500 rpm and 300 Nm torque. It can be seen that the control sample GPF1 shows no significant increase in pressure difference before or after a commissioning run on base fuel. GPF2 shows a substantial increase in filtration efficiency as a result of the commissioning process of the invention, but at the same time shows only a small increase in pressure difference GPF3 in contrast shows a similar increase to GPF2 in filtration efficiency, but a much larger resulting increase in pressure difference across the GPF.

The results in FIG. 4 demonstrate that the process of the invention provides an improved solution to commissioning such particulate filters. By increasing filtration efficiency, the filter is more able to function as an effective trap for engine-out hydrocarbonaceous particulate matter, allowing tailpipe particulate emissions to be better met. By providing this filtration increase with a lower corresponding debit on pressure difference across the filter, the commissioning process of the invention contributes less to the secondary problem of exhaust back-pressure build-up, as well as avoiding the other debits incurred by the prior art addition of lubricating oil and its additives into the fuel.

C) X-Ray Analysis of the Commissioned Filters

GPF X-ray scanning was performed using a Custom 225 kV/450 kV hutch instrument (for the overview scans) and Nikon 225 HMX (for the region of interest; inlet and outlet channels).

The GPFs from the commissioning tests were scanned for a 234.4 µm overview, with 32.1 µm ROI at the inlet and outlet. Additionally, GPF2 containing iron oxide was scanned at 70.3 µm full overview. The GPF was mounted within the analysis chamber for the scan. Intensities were normalized across all datasets. The reconstructed data was processed with Matlab™, and then analysed using ImageJ for depth profile analysis and Avizo™ for image segmentation to provide measurements on the channel and plug regions. The 3D rendering was performed using Drishti, assigning separate transfer functions to the filter, plug and iron signals.

FIG. 5 is a radiograph of GPF2 following the above 3-stage experiment. The X-ray analysis revealed a concentration of iron oxide deposit on the end plugs of the filter channels, visible on the image as darker shadowing at the tops and bottoms of the channels (which run vertically in the figure).

FIG. 6 shows X-ray depth profiles along the length of the filter channels. The intensity of the signal corresponds to the density of the structure and in turn allows mapping of the distribution of metal oxide deposit along the length of the channels In GPF1, the baseline shows peaks at either end of the slice depth, corresponding to the denser end plugs of the channels. The lower intensity spanning these ends indicates the density of the porous longitudinal channel walls, through which the exhaust gas passes during filtration.

In GPF3, the commissioning stage leading to deposition of lubricating oil additive residue in the filter resulted in a significant increase in intensity in the signal, including along the filter channel walls. This indicates a build-up of metallic ash deposit throughout the filter, including a thickness of deposit building up along the channel walls, through which filtration occurs. This observation is consistent with the finding of increasing pressure difference across the GPF3, seen in FIG. 4. In contrast, the intensity increase seen for GPF2 (commissioned according to the invention) is concentrated in the areas of the top and bottom plugs, with much less increase along the longitudinal channel walls. This is in turn consistent with the observation that the process of the invention increases filtration efficiency with a lower concomitant increase in pressure difference across the filter.

The process according to the invention therefore provides an improved balance of filtration properties, allowing new or reconditioned particulate filters to be commissioned to higher filtration efficiency in a single metal oxide treatment without the disadvantages of the prior art addition of lubricating oil to the fuel.

What is claimed is:

1. A process for commissioning a particulate filter for the exhaust system of a device, the device being powered in whole or in part by an internal combustion engine fuelled by a liquid hydrocarbonaceous fuel untreated with lubricating oil, the process comprising:
   (i) passing a gas stream through an uncarbonised new, or decarbonised reconditioned, particulate filter comprising a ceramic monolith with channels, which in turn comprises end-plugs;
   (ii) releasing into the gas stream upstream of the particulate filter a flow of metal oxide particles in a single period of release sufficient to deposit metal oxide particles onto the uncarbonised or decarbonised surfaces of the end-plugs of the channels of the monolithic filter exposed to the gas stream; and
   (iii) consigning the particulate filter to operate on the exhaust gas emitted from the internal combustion engine of the device in service,
   wherein the gas stream of the commissioning step (i) is the exhaust gas stream emitted from the internal combustion engine of the device when first operated after installation of the particulate filter, wherein the metal oxide particles used in the commissioning step (ii) are released into the exhaust gas stream upstream of the particulate filter by addition of a fuel additive to a single quantity of engine fuel which, upon combustion of the fuel, releases metal oxide particles into the exhaust gas stream emitted from the combustion chamber,
   wherein the fuel additive consists of iron oxide colloidally dispersed by one or more organic compounds in a hydrocarbonaceous diluent to disperse the iron oxide in the fuel and does not contain any lubricating oil or other, heavier petroleum fraction or additives originating therefrom, and
   wherein the internal combustion engine is fueled by a liquid hydrocarbonaceous fuel untreated with lubricating oil, such that the process results in the commissioned filter having a mean filtration efficiency increase of at least 25% and simultaneously an increase in a mean pressure difference across the commissioned filter of less than 25%, relative to a pre-commissioned filter, when the internal combustion engine is operated at 5,500 rpm and 300 Nm torque.

2. The process of claim 1, wherein the device is a vehicle or marine vessel, or a stationary generator or plant.

3. The process of claim 1, wherein the internal combustion engine is fuelled by gasoline fuel or biofuel, or mixtures thereof;
wherein the device is powered by a hybrid power source comprising the internal combustion engine and one or more electric drive motors.

4. The process of claim 1, wherein, following installation of the particulate filter, the internal combustion engine is initially operated on a single quantity of the fuel containing the fuel additive, this constituting the commissioning steps (i) and (ii) of the process; and is thereafter consigned to operate in service on fuel not containing the fuel additive, such that the filter thereafter operates on exhaust gas not containing metal oxide particles originating from the fuel.

5. The process of claim 1, wherein the single quantity of fuel is no more than that required to fill the on-board fuel tank of the device.

6. The process of claim 1, wherein the total deposition of iron oxide on the channels of the particulate filter is in the range of 0.5 to 4.0 grams of iron oxide per litre of particulate filter gaseous capacity.

7. The process of claim 1, wherein commissioning steps (i) and (ii) are conducted on the particulate filter before it is installed in its operating position in the exhaust system of the device of step (iii);
wherein:
the particulate filter is firstly attached to a gas line downstream of a gas stream source remote from the device, step (i) thereafter being conducted with a gas stream other than engine exhaust gas from the device; wherein the metal oxide particles used in step (ii) are released directly into this gas stream, upstream of the particulate filter; and wherein, in step (iii), the particulate filter is detached from the remote gas line and positioned operationally in the exhaust system of the device.

8. A process for operating an internal combustion engine equipped with an exhaust system having a particulate filter, the process comprising:
(a) commissioning the particulate filter according to the process of claim 1; and thereafter
(b) operating the engine in service with the particulate filter in its operational position in the exhaust system, in the absence of further periods of deposition of metal oxide particles by the means used in the commissioning process of step (a);
wherein following the commissioning steps (i) and (ii), the engine is operated in service on a liquid hydrocarbonaceous fuel untreated with lubricating oil and not containing the fuel additive that disperses the metal oxide precursor in the fuel.

9. A commissioned particulate filter obtained by the process of claim 1.

10. The process of claim 1, wherein the one or more organic compounds dispersing the iron oxide particles consists of one or more polyisobutenyl succinic acids derived from polyisobutylene having a number average molecular weight from 700 to 1300 g/mol, in combination with one or more aliphatic monocarboxylic acids containing from 10 to 18 carbon atoms.

11. The process of claim 1, wherein the commissioning steps (i) and (ii) are conducted with the particulate filter installed in its operating position in the exhaust system of the device of step (iii).

* * * * *